United States Patent
Mukai et al.

(10) Patent No.: US 9,353,485 B2
(45) Date of Patent: May 31, 2016

(54) VEHICLE PICK-UP AND DELIVERY DEVICE AND TRACK-BASED TRANSPORTATION SYSTEM PROVIDED THEREWITH

(75) Inventors: Yasuyuki Mukai, Tokyo (JP); Toshiaki Asanoma, Tokyo (JP); Yoshinobu Murakami, Tokyo (JP); Hiroyuki Maeyama, Tokyo (JP); Akihiro Kubo, Tokyo (JP); Kousuke Katahira, Mihara (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/240,122

(22) PCT Filed: Aug. 23, 2012

(86) PCT No.: PCT/JP2012/071291
§ 371 (c)(1),
(2), (4) Date: Feb. 21, 2014

(87) PCT Pub. No.: WO2013/031630
PCT Pub. Date: Mar. 7, 2013

(65) Prior Publication Data
US 2014/0190366 A1 Jul. 10, 2014

(30) Foreign Application Priority Data

Aug. 31, 2011 (JP) .................................. 2011-189382
Aug. 31, 2011 (JP) .................................. 2011-189383

(51) Int. Cl.
*B61B 13/00* (2006.01)
*E01B 7/00* (2006.01)
(Continued)

(52) U.S. Cl.
CPC . *E01B 7/00* (2013.01); *B61B 13/00* (2013.01); *B62D 1/26* (2013.01); *E01B 25/28* (2013.01)

(58) Field of Classification Search
CPC ............... B66C 7/02; B66C 9/06; E01B 7/00; E01B 25/00; E01B 25/22; E01B 25/26; E01B 13/00; B61B 13/04; B62D 1/26
See application file for complete search history.

(56) References Cited

U.S. PATENT DOCUMENTS 4,267,779 A * 5/1981 Binder .......................... 104/247
4,346,659 A * 8/1982 Binder .......................... 104/247
(Continued)

FOREIGN PATENT DOCUMENTS

CN 101472776 7/2009
CN 101490340 7/2009
(Continued)

OTHER PUBLICATIONS

International Search Report issued Nov. 27, 2012 in International (PCT) Application No. PCT/JP2012/071291 with English translation.

(Continued)

*Primary Examiner* — Jason C Smith
(74) *Attorney, Agent, or Firm* — Wenderoth, Lind & Ponack, L.L.P.

(57) ABSTRACT

A vehicle pick-up and delivery device includes: two mainline tracks including a pair of first guide portions which guide a pair of first guide wheels provided on a vehicle on an outer side of each of the first guide wheels; a pick-up and delivery travel path on which the vehicle is capable of traveling and which is provided between the two mainline tracks and is configured to pick up and deliver the vehicle between the two mainline tracks; a second guide portion which is provided inside the pick-up and delivery travel path and guides a second guide wheel disposed below the vehicle; and a switching unit which is provided on the mainline tracks and is capable of switching a direction of the vehicle between a direction along the mainline tracks and a direction along the pick-up and delivery travel path.

14 Claims, 17 Drawing Sheets

(51) Int. Cl.
 *E01B 25/28* (2006.01)
 *B62D 1/26* (2006.01)

(56) References Cited

U.S. PATENT DOCUMENTS

| | | | | |
|---|---|---|---|---|
| 6,220,173 | B1* | 4/2001 | Sauerwein | 104/130.01 |
| 6,308,818 | B1* | 10/2001 | Bonora et al. | 198/465.1 |
| 6,418,855 | B1* | 7/2002 | Fischer | 104/118 |
| 8,408,142 | B2* | 4/2013 | Maeyama et al. | 104/245 |
| 8,561,547 | B2* | 10/2013 | Shiroyama et al. | 105/215.2 |
| 8,770,111 | B2* | 7/2014 | Yamamoto et al. | 104/89 |
| 8,813,653 | B2* | 8/2014 | Izumi et al. | 104/130.01 |
| 8,826,825 | B2* | 9/2014 | Shibata et al. | 104/89 |
| 2007/0163461 | A1* | 7/2007 | Shiwaku | 104/89 |
| 2010/0043665 | A1* | 2/2010 | Brigham | 104/88.01 |
| 2010/0242784 | A1* | 9/2010 | Oguro et al. | 104/130.01 |
| 2010/0326758 | A1* | 12/2010 | Kissel | 180/204 |
| 2011/0265683 | A1* | 11/2011 | Kurahashi et al. | 105/215.2 |
| 2012/0012028 | A1* | 1/2012 | Shiroyama et al. | 105/157.1 |
| 2013/0193277 | A1* | 8/2013 | Kawauchi et al. | 246/415 R |
| 2013/0269564 | A1* | 10/2013 | Yoo et al. | 104/91 |
| 2014/0090575 | A1* | 4/2014 | Nagamine et al. | 104/91 |
| 2014/0190366 | A1* | 7/2014 | Mukai et al. | 104/130.01 |
| 2014/0238260 | A1* | 8/2014 | Conte et al. | 104/130.01 |

FOREIGN PATENT DOCUMENTS

| | | |
|---|---|---|
| JP | 50-119107 | 9/1975 |
| JP | 55-126601 | 9/1980 |
| JP | 57-125673 | 8/1982 |
| JP | 05-112901 | 5/1993 |
| JP | 11-059417 | 3/1999 |
| JP | 2000-64205 | 2/2000 |
| JP | 3414213 | 6/2003 |
| JP | 2006-241684 | 9/2006 |
| JP | 2010-280240 | 12/2010 |
| JP | 2011-011652 | 1/2011 |
| JP | 2011-012466 | 1/2011 |
| JP | 2011-038395 | 2/2011 |

OTHER PUBLICATIONS

Written Opinion of the International Searching Authority issued Nov. 27, 2012 in International (PCT) Application No. PCT/JP2012/071291.

Office Action issued Sep. 29, 2015 in Korean Patent Application No. 10-2014-7003912, with English translation.

Office Action and Search Report issued Dec. 24, 2014 in Chinese Application No. 201280041335.7, with partial English translation.

* cited by examiner

VEHICLE PICK-UP AND DELIVERY DEVICE AND TRACK-BASED TRANSPORTATION SYSTEM PROVIDED THEREWITH

TECHNICAL FIELD

The present invention relates to a vehicle pick-up and delivery device which picks up and delivers a vehicle between two traveling tracks, and a track-based transportation system provided therewith.

Priority is claimed on Japanese Patent Application No. 2011-189382, filed Aug. 31, 2011, and Japanese Patent Application No. 2011-189383, filed Aug. 31, 2011, the contents of which are incorporated herein by reference.

BACKGROUND ART

As a new means of transportation other than a bus or a railroad, a track-based transportation system has been known in which a vehicle travels on a track by traveling wheels configured of rubber tires, and guide wheels provided on both side portions of the vehicle are guided by guide rails provided on both side portions of the track. In general, the track-based transportation system is referred to as a new transportation system or an Automated People Mover (APM).

In the above-described track-based transportation system, two mainline tracks are provided in parallel to simultaneously convey a vehicle in two different directions, and thus a double track is realized, and a pick-up and delivery travel path capable of picking up and delivering the vehicle between two mainline tracks in some sections of the mainline tracks is provided.

In the pick-up and delivery travel path, branch wheels provided below guide wheels in both side portions of the vehicle are guided by guide rails provided on both side portions of the pick-up and delivery travel path, and thus the vehicle is picked up and delivered between two mainline tracks. At this time, in the pick-up and delivery guide path, it is necessary to introduce the vehicle so as to be in a state in which one guide wheel of the vehicle is guided to the guide rail of one side portion from a state in which the other guide wheel of the vehicle is guided to the guide rail of the other side portion. That is, in order to maintain a state in which the vehicle is always guided by guide rails during traveling of the vehicle on the pick-up and delivery travel path, in some sections of the pick-up and delivery travel path, it is necessary to overlap the guide rail of the one side portion and the guide rail of the other side portion in a direction along the pick-up and delivery guide path. Accordingly, in a place in which the pick-up and delivery travel path is installed, in addition to the width of two mainline tracks, the width of the pick-up and delivery guide path between the mainline tracks are needed, and thus, as a whole, the width in which three vehicles can run in parallel are needed.

Therefore, for example, in PLT 1, a branch device is disclosed in which a branch path connecting two tracks provided in parallel is formed. The branch device includes a removal region in which a guide rail of the track is removed. In the removal region, a first movable rail which is rotatably connected to a base end of an outer guide rail of one track and a fourth movable rail which is rotatably connected to a base end of an inner guide rail of the other track are rotated by a control device and connected to each other. Moreover, a second movable rail which is rotatably connected to a base end of an inner guide rail of one track and a third movable rail which is rotatably connected to a base end of an outer guide rail of the other track are rotated by a control device and connected to each other. In this way, the branch path is formed, and thus the vehicle can travel from one track to the other track without a gap between two tracks being widened.

CITATION LIST

Patent Literature

PLT 1: Japanese Unexamined Patent Application, First Publication No. 2011-12466

SUMMARY OF INVENTION

Technical Problem

However, in the structure disclosed in PLT 1, since the guide rail, which guides the vehicle on both sides in a width direction on the track, moves and the vehicle is guided to the pick-up and delivery travel path (branch path), a mechanism for rotating the guide rail is needed, but details thereof are not disclosed. Moreover, when the mechanism is adopted, since the guide rail needs to rotate to straddle the track, a branch mechanism becomes a large-scale structure. In addition, supporting the guide rail, which straddles the track, on the track so as not to interfere with the traveling of the vehicle is difficult.

An object of the present invention is to provide a vehicle pick-up and delivery device which can pick up and deliver a vehicle using a simple configuration while capable of suppressing an occupation range in a width direction by reducing a width between double-line tracks in a pick-up and delivery travel path of the vehicle, and a track-based transportation system having the vehicle pick-up and delivery device.

Solution to Problem

A vehicle pick-up and delivery device according to a first aspect of the present invention includes: two mainline tracks which include a pair of first guide portions which guide a pair of first guide wheels provided on a vehicle on an outer side of each of the first guide wheels; a pick-up and delivery travel path on which the vehicle is capable of traveling and which is provided between the two mainline tracks and is configured to pick up and deliver the vehicle between the two mainline tracks; a second guide portion which is provided inside the pick-up and delivery travel path and guides a second guide wheel disposed below the vehicle; and a switching unit which is provided on the mainline tracks and is capable of switching a direction of the vehicle between a direction along the mainline tracks and a direction along the pick-up and delivery travel path.

According to the vehicle pick-up and delivery device, when the vehicle traveling on one of two mainline tracks approaches the pick-up and delivery travel path, the vehicle is guided in either a direction along the mainline track or a direction along the pick-up and delivery travel path by the switching unit. When the direction of the mainline track is selected, the vehicle is guided by the switching unit and the first guide portion opposite to the side of the pick-up and delivery travel path of the pair of first guide portions, and the vehicle travels on the mainline track as it is.

Moreover, when the direction of pick-up and delivery travel path is selected, the vehicle is guided in the direction of the pick-up and delivery travel path by the switching unit and the first guide portion of the side of the pick-up and delivery travel path of the pair of first guide portions, and the second guide wheel of the vehicle can be guided by the second guide portion. Here, the second guide portion is installed inside the pick-up and delivery travel path, that is, the inner side in the width direction of the pick-up and delivery travel path, and the second guide wheel is disposed between both side portions of the vehicle below the vehicle to correspond to the second guide portion. Accordingly, if two guide units are provided in both side portions of the pick-up and delivery travel path in the pick-up and delivery travel path, a transfer operation from a state in which the vehicle is guided by one guide unit to a state in which the vehicle is guided by the other guide unit is not needed, and the vehicle does not become unrestricted while the vehicle travels along the pick-up and delivery travel path. Therefore, an overlap section between two guide units can be reduced.

In addition, since the vehicle can be introduced to the pick-up and delivery travel path by only the second guide wheel being guided to the second guide portion by the switching unit, the entire configuration of the vehicle pick-up and delivery device can be simplified.

Moreover, in the vehicle pick-up and delivery device according to a second aspect of the present invention, the two mainline tracks may include the pair of first guide portions only at a position in which the vehicle is switched by the switching unit.

According to the first guide portions, a side guide type can be adopted by only the position at which the vehicle is switched. That is, in the mainline track other than the position at which the vehicle is switched, for example, a center guide type, in which the vehicle is guided by the second guide wheel, can be adopted. Moreover, also in the case in which the center guide type is adopted, the vehicle can be picked up and delivered using a simple configuration while the width between double-line tracks on the pick-up and delivery travel path is reduced by the switching unit and the second guide portion and an occupation range in the width direction is suppressed.

In addition, in the vehicle pick-up and delivery device according to a third aspect of the present invention, the pair of first guide portions may be guide rails which are disposed outside both side portions of the vehicle.

According to the first guide portions, the vehicle is securely guided on the mainline track.

Moreover, in the vehicle pick-up and delivery device according to a fourth aspect of the present invention, the pair of first guide portions may be guide rails which are disposed inside both side portions of the vehicle.

According to the first guide portions, the vehicle can be securely guided on the mainline track, the width of the mainline track can be reduced, and thus the entire occupation range in a width direction including the mainline track and the pick-up and delivery travel path can be further suppressed.

In addition, in the vehicle pick-up and delivery device according to a fifth aspect of the present invention, the pair of first guide portions may be provided to be convex on the mainline track and the pick-up and delivery travel path, and may be configured of inner surfaces in a width direction of a travel path on which a pair of tires are rolled.

Since the travel path also serves as the first guide portions, it is not necessary to install the first guide portions such as a separate guide rail or the like, and thus the entire occupation range in the width direction including the mainline track and the pick-up and delivery travel path can be further suppressed while costs are suppressed.

Moreover, in the vehicle pick-up and delivery device according to a sixth aspect of the present invention, the second guide portion may be provided at a center in a width direction of the pick-up and delivery travel path.

Since the second guide portion is provided at the center in the width direction, the disposition of the second guide wheel of the vehicle side can be positioned at the center of the lower portion of the vehicle, and also in a case in which the front and the rear of the vehicle are changed with each other with respect to the traveling direction of the vehicle for convenience of operation of the vehicle, the vehicle can travel on the pick-up and delivery travel path without difficulty, and the pick-up and delivery of the vehicle from one mainline track to the other mainline track can be performed.

Moreover, in the vehicle pick-up and delivery device according to a seventh aspect of the present invention, the second guide wheel may be a guide roller which is capable of rotating around an axis extending in a vertical direction, and the second guide portion may be a guide rail which regulates the second guide wheel in a width direction of the vehicle.

In this way, since the guide rail and the guide roller engage with each other and the movement in the width direction of the guide roller is regulated, the vehicle can travel without meandering or the like in the width direction of the vehicle in the pick-up and delivery travel path, and the pick-up and delivery of the vehicle from one mainline track to the other mainline track can be securely preformed.

In addition, in the vehicle pick-up and delivery device according to an eighth aspect of the present invention, a concave portion, which is opened upward in a longitudinal direction of the second guide portion and into which the second guide wheel is inserted from above, may be formed in the second guide portion.

According to the concave portion, since the second guide wheel is regulated from both sides in the width direction, the vehicle can travel along the pick-up and delivery travel path without meandering or the like, and the pick-up and delivery of the vehicle can be securely preformed.

Moreover, in the vehicle pick-up and delivery device according to a ninth aspect of the present invention, the second guide portion may be interposed by the second guide wheels which are provided in pairs on the vehicle.

Since the second guide portion is interposed by the second guide wheels, the movement of the vehicle in the width direction is regulated, and thus the vehicle can travel along the pick-up and delivery travel path without meandering or the like, and the pick-up and delivery of the vehicle can be securely preformed.

In addition, in the vehicle pick-up and delivery device according to a tenth aspect of the present invention, the switching unit may include: a pair of branch guide portions each of which is capable of guiding the second guide wheel; and a moving unit which is provided on an outer side in a width direction of the branch guide portions, and is capable of moving the pair of branch guide portions to a first position in which one of the branch guide portions is capable of guiding the second guide wheel in a direction along the mainline track and the other of the branch guide portions does not interfere with the second guide wheel, and to a second position in which the other of the branch guide portions is capable of guiding the second guide wheel in a direction along the pick-up and delivery travel path and the one of the branch guide portions does not interfere with the second guide wheel.

According to the switching unit, when the vehicle approaches a branch position, the branch guide portions can guide the second guide wheel to either the direction along the mainline track or the direction along the pick-up and delivery travel path.

When the second guide wheel is guided in the direction along the mainline track, the other of the branch guide portions moves to the first position at which the other of the branch guide portions and the second guide wheel do not interfere with each other, and thus the vehicle can be smoothly and securely guided in the direction along the mainline track. Moreover, when the second guide wheel is guided in the direction along the pick-up and delivery travel path, the one of the branch guide portions moves to the second position at which the one of the branch guide portions and the second guide wheel do not interfere with each other, and thus the vehicle can be smoothly and securely guided in the direction along the pick-up and delivery travel path. According to the configuration of the branch guide portions, the entire configuration of the switching unit is simplified.

In addition, in the vehicle pick-up and delivery device according to an eleventh aspect of the present invention, the branch guide portions may be provided at a center in a width direction of the mainline track.

By providing the branch guide portions, the switching unit can be shifted to the inner side in the width direction of the mainline track. Accordingly, when the switching unit is provided on both side portions of the vehicle, it is not necessary to separately provide a space to install the switching unit which is required at the outer side in the width direction of the mainline track. Accordingly, the width of the mainline track at the switching position can be reduced, and thus the entire occupation range in the width direction including the mainline track and the pick-up and delivery travel path can be further suppressed.

Moreover, by providing the branch guide portions, the second guide wheel of the vehicle can be disposed at the center position in the lower portion of the vehicle, and also in a case in which the front and the rear of the vehicle are changed with each other with respect to the traveling direction of the vehicle for convenience of operation of the vehicle, direction switching of the vehicle can be performed without difficulty.

In addition, in the vehicle pick-up and delivery device according to a twelfth aspect of the present invention, one of the pair of branch guide portions may be a first branch rail which is capable of guiding the second guide wheel to the first position, and the other of the pair of branch guide portions may be a second branch rail which is capable of guiding the second guide wheel to the second position.

In this way, the pair of the branch guide portions are configured of the first branch rail and the second branch rail, and thus the vehicle can be securely introduced in either a first direction or a second direction.

Moreover, in the vehicle pick-up and delivery device according to a thirteenth aspect of the present invention, concave portions, which are opened upward in longitudinal directions of the first branch rail and the second branch rail and into which the second guide wheel is inserted from above, may be formed on the first branch rail and the second branch rail.

According to the concave portion, the branch guide wheel is regulated from both sides in the width direction, and thus the vehicle can travel at the switching position without meandering or the like, and the direction switching of the vehicle can be more securely performed.

In addition, a track-based transportation system according to a fourteenth aspect of the present invention includes: the above-described vehicle pick-up and delivery device; and the vehicle below which the second guide wheel is disposed.

According to the track-based transportation system, when the vehicle travels on the pick-up and delivery travel path, if two guide units are provided on both side portions of the pick-up and delivery travel path, a transfer operation from a state in which the vehicle is guided by one of the guide units to a state in which the vehicle is guided by the other of the guide units is not needed, and the vehicle does not become unrestricted while the vehicle travels along the pick-up and delivery travel path. Therefore, an overlap section between the two guide units can be reduced.

In addition, since the vehicle can be introduced on the pick-up and delivery travel path by only the second guide wheel being guided to the second guide portion by the switching unit, the entire configuration of the pick-up and delivery device is simplified. Accordingly, the pick-up and delivery of the vehicle between the mainline tracks can be performed using a simple configuration while the width between double-line tracks on the pick-up and delivery travel path can be reduced and the occupation range in the width direction can be suppressed.

Advantageous Effects of Invention

According to the above-described vehicle pick-up and delivery device and the above-described track-based transportation system, the pick-up and delivery of the vehicle can be performed using a simple configuration while reducing the width between the double-line tracks on the pick-up and delivery travel path and suppressing the occupation range in the width direction by the second guide portion which is provided inside the pick-up and delivery travel path.

DESCRIPTION OF EMBODIMENTS

Hereinafter, a track-based transportation system 1 according to a first embodiment of the present invention will be described.

Figure 1:
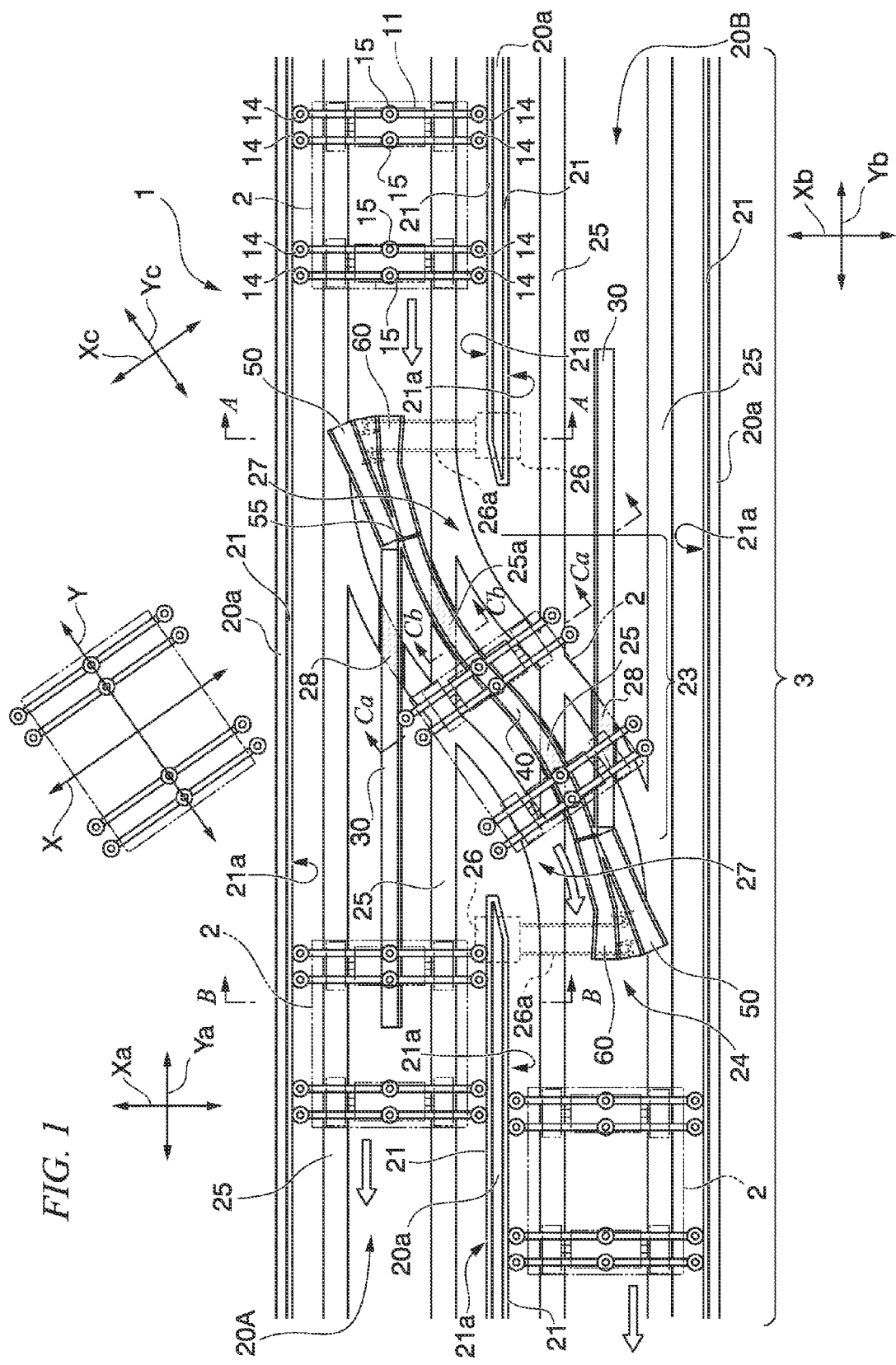
FIG. 1 is a view of a track-based transportation system according to a first embodiment of the present invention when viewed from above.

As shown in FIG. 1, the track-based transportation system 1 of the present embodiment is a side guide type new transportation system which includes a vehicle pick-up and delivery device 3 which mainly includes two mainline tracks 20A and 20B in which guide rails (first guide portions) 21 are provided on both side portions and a pick-up and delivery travel path 23 which is provided between the two mainline tracks, and a vehicle 2 in which first guide wheels 14 guided by the guide rails 21 are provided on both side portions.

As shown in FIGS. 1 to 4B, the vehicle 2 includes a box-shaped vehicle body 10 which accommodates a passenger, and a traveling device 11 which is disposed below the vehicle body 10 and supports the vehicle body 10. Two traveling devices 11 are installed with a gap in an extending direction of the vehicle body 10, that is, in a front-rear direction Y.

Moreover, the vehicle 2 includes first guide wheels 14 which are provided on both side portions in a width direction X of the vehicle 2 which becomes a direction orthogonal to the front-rear direction Y and are guided by each corresponding guide rail 21, and second guide wheels 15 which are provided below the traveling device 11 and at an approximately center portion in the width direction X of the vehicle 2.

Hereinafter, a traveling direction in the vehicle 2 is referred to as the front-rear direction Y. Moreover, directions along the mainline tracks 20A and 20B, which become the traveling direction of the traveling vehicle 2, are referred to as front-rear directions Ya and Yb, respectively. Similarly, a direction along the pick-up and delivery travel path 23 is referred to as a front-rear direction Yc. In addition, the left-right direction toward the traveling direction of the vehicle 2 is referred to as the width direction X.

Moreover, in the mainline tracks 20A and 20B, the left-right directions, which are orthogonal to the front-rear direction Ya and Yb, respectively, toward the traveling direction of the traveling vehicle 2 are referred to as width directions Xa and Xb. Similarly, also in the pick-up and delivery travel path 23, the left-right direction toward the traveling direction of the traveling vehicle 2 is referred to as a width direction Xc.

In the present embodiment, two traveling devices 11 are provided in the front-rear direction Y of the vehicle 2. Moreover, each traveling device 11 includes a pair of rubber tires 13 which are provided on both sides in the width direction X of the vehicle 2, and the rubber tires 13 can be rotated by a rotation shaft 12 which extends in the width direction X of the vehicle 2.

Moreover, a pair of first guide wheels 14 are rotatably mounted around a rotation shaft, which extends in the vertical direction of the vehicle 2, in both sides in the width direction X of the traveling device 11. Pairs of first guide wheels 14 are provided in two sets with a constant gap in the front-rear direction Y of the vehicle 2.

The second guide wheels 15 are guide rollers which are disposed below the vehicle 2, that is, are installed to protrude from the lower portion of the traveling device 11 and are rotatably mounted around the rotation shaft in the vertical direction. In the present embodiment, each of the second guide wheels 15 is provided at an approximate center in the width direction X of the vehicle 2 between the pair of rubber tires 13.

Next, the vehicle pick-up and delivery device 3 will be described.

As shown in FIGS. 2 to 4B, the vehicle pick-up and delivery device 3 includes two mainline tracks 20A and 20B, and a pick-up and delivery travel path 23 which is installed between the mainline tracks 20A and 20B and enables coming and going of the vehicle 2 between the two mainline tracks 20A and 20B.

Moreover, the vehicle pick-up and delivery device 3 includes a second fixed guide rail (second guide portion) 40 which is disposed inside the pick-up and delivery travel path 23 and guides the second guide wheel 15 of the vehicle 2, and a switching unit 24 which performs switching of whether the vehicle 2 travels in the directions of the mainline tracks 20A and 20B or the vehicle 2 travels in the direction of the pick-up and delivery travel path 23 in the branch portion 27.

Each of the mainline tracks 20A and 20B is a travel path of the vehicle 2 which is enclosed by left and right side walls 20a and a bottom surface 20c and has a U shaped cross-section. Two travel portions 25, on which the pair of rubber tires 13 of the vehicle 2 roll, are provided to protrude from the bottom surface 20c, the entire surface of upper surfaces of the travel portions 25 is formed in a flat surface, and the rubber tires 13 can roll on the entire surface.

In addition, each of the mainline tracks 20A and 20B includes a guide rail 21 which is supported by a support portion 22 standing up from a bottom surface 20c along the left and right side walls 20a of the mainline tracks 20A and 20B and has an H-shaped cross-section. The guide rails 21 extend in front-rear directions Ya and Yb of the mainline tracks 20A and 20B. The outer circumferential surface of the first guide wheel 14 of the vehicle 2 contacts a guide surface 21a which is a surface opposite to the vehicle 2, and thus the guide rail 21 can guide the vehicle 2 in directions along the mainline tracks 20A and 20B.

Moreover, in the mainline tracks 20A and 20B, at a branch portion 27 which is a position branching into the pick-up and delivery travel path 23, the side wall 20a of the side, which is connected to the pick-up and delivery travel path 23 in both of the side walls 20a, is divided, and the vehicle 2 can travel to the pick-up and delivery travel path 23. Moreover, the travel portions 25 each extend in the directions along the mainline tracks 20A and 20B and branch into the pick-up and delivery travel path 23 side.

Figure 3:
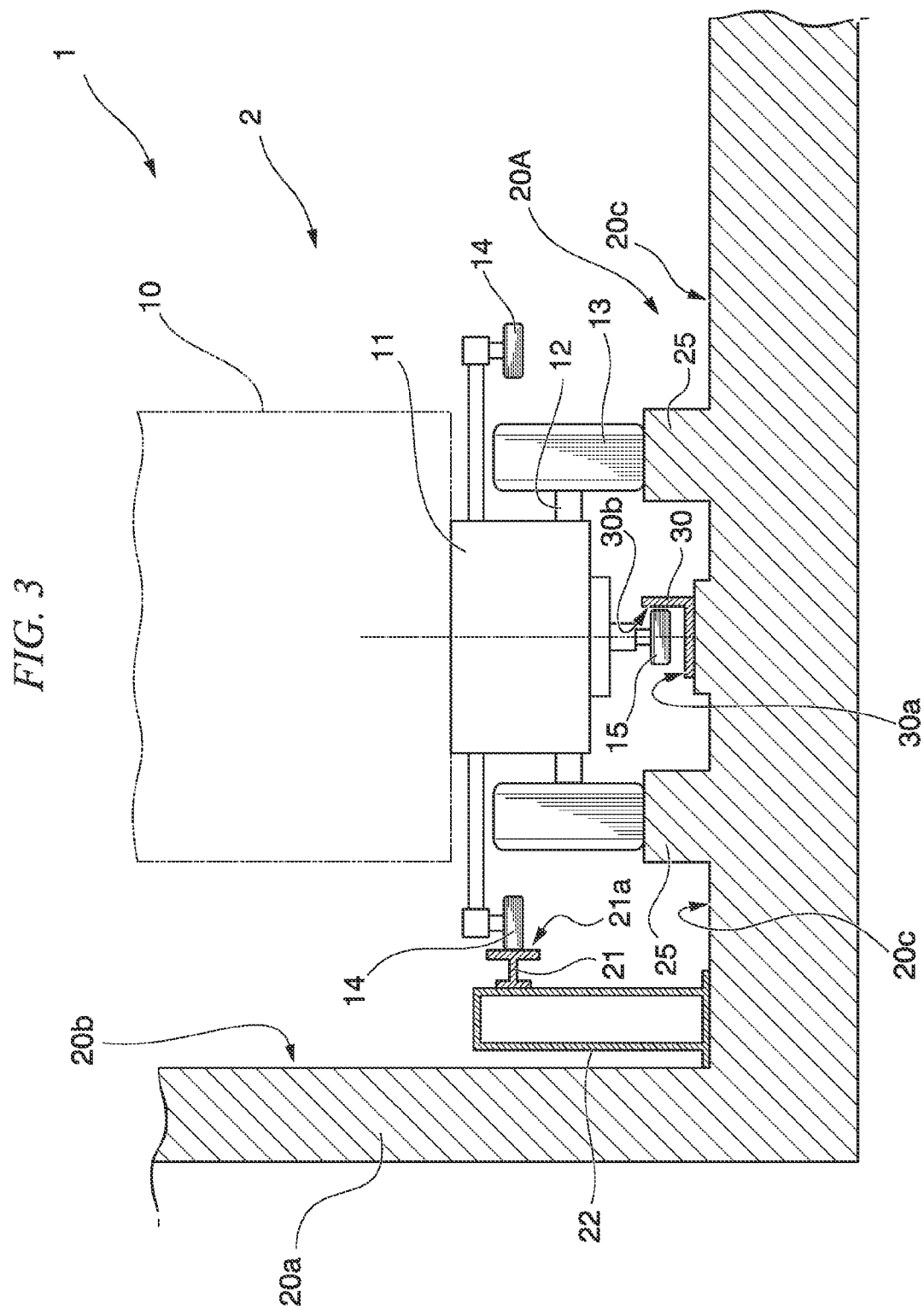
FIG. 3 is a cross-sectional view of the track-based transportation system according to the first embodiment of the present invention when viewed in a front-rear direction, and shows a B-B cross-section of FIG. 1.

In addition, in the front sides in the front-rear directions Ya and Yb in the branch portion 27, the mainline tracks 20A and 20B each include first fixed guide rails 30 which extend in the directions along the mainline tracks 20A and 20B at approximate centers in the width directions Xa and Xb on the bottom surface 20c and which can guide second guide wheels 15 of the vehicle 2 in the directions along the mainline tracks 20A and 20B. As shown in FIG. 3, the cross-sectional shape of the first fixed guide rail 30 has an L shape. That is, the first fixed guide rail 30 includes a bottom portion 30a parallel to the bottom surface 20c of each of the mainline tracks 20A and 20B, and a side portion 30b which is provided to protrude upward from the inner side (the right side of the paper surface of FIG. 3) of each of the width directions Xa and Xb of the bottom portion 30a, extends in each of the directions along the mainline tracks 20A and 20B, and forms a guide surface on which the second guide wheel 15 contacts and rolls.

The pick-up and delivery travel path 23 includes two travel portions 25 which are provided to protrude from the bottom surface 23c and on which the pair of rubber tires 13 of the vehicle 2 roll. The travel portions 25 each extend in the two mainline tracks 20A and 20B, and are connected to the travel portions 25 corresponding to the mainline tracks 20A and 20B at each branch portion 27. Moreover, in the present embodiment, the second fixed guide rail 40 is provided inside the pick-up and delivery travel path 23, that is, at an approximate center in the width direction Xc of the bottom surface 23c.

Moreover, both ends of the second fixed guide rail 40 are curved along each of the corresponding mainline tracks 20A and 20B, and are disposed to be arranged in the width directions Xa and Xb with respect to the end of the rear side in the front-rear direction Ya of the first fixed guide rail 30 in the mainline track 20A and with respect to the end of the front side in the front-rear direction Yb of the first fixed guide rail 30 in the mainline track 20B.

Figure 4A:
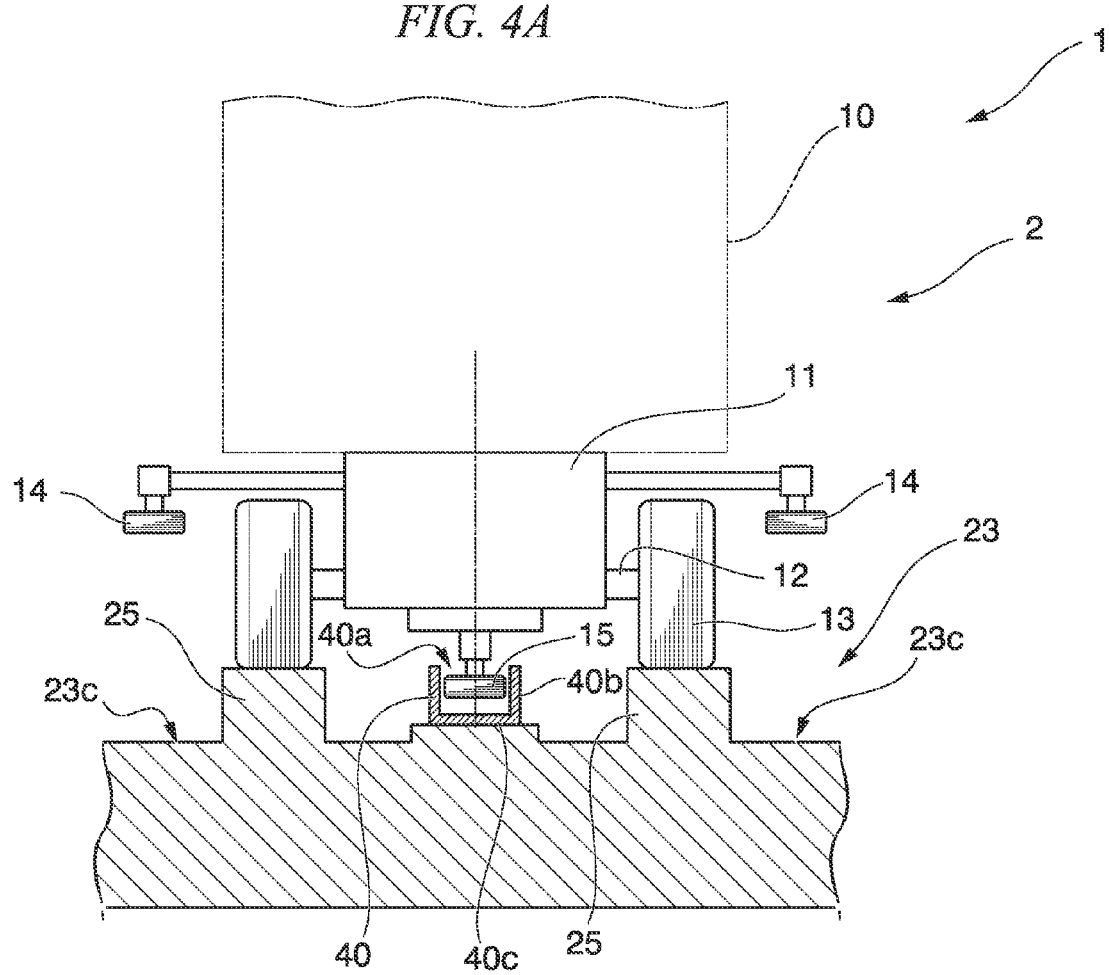
FIG. 4A is a cross-sectional view of the track-based transportation system according to the first embodiment of the present invention when viewed in a front-rear direction, and shows a Ca-Ca cross-section of FIG. 1.

As shown in FIG. 4A, the second fixed guide rail 40 includes a bottom portion 40c which is supported by the bottom surfaces 23c and 20c, and side portions 40b which are erected from both sides in the width direction Xc of the bottom portion 40c. In the second fixed guide rail 40, a concave portion 40a is formed, which is opened upward in a longitudinal direction of the second fixed guide rail 40 itself by both side portions 40b and the bottom portion 40c, and thus the cross-section of the second fixed guide rail has a concave shape. The width of the concave portion 40a is set so as to insert the second guide wheels 15, and mutual opposing surfaces of both side portions 40b can guide the second guide wheels 15 as guide surfaces.

Figure 4B:
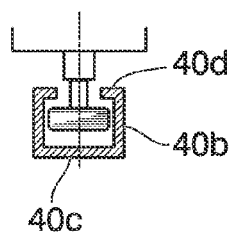
FIG. 4B is a cross-sectional view of the track-based transportation system according to the first embodiment of the present invention when viewed in a front-rear direction, and shows a Cb-Cb cross-section of FIG. 1.

Moreover, the second fixed guide rail 40 includes an embedded portion 25a, which is embedded in the travel portions 25, in a portion which straddles the travel portions 25 of the mainline tracks 20A and 20B. As shown in FIG. 4B, in the embedded portion 25a, the second fixed guide rail 40 includes extensions 40d extending from the upper end of each side portion 40b toward the other side portion 40b. A gap, through which rotation shafts of the second guide wheels 15 can be inserted, is formed between the extensions 40d which extend from both side portions 40b. That is, in the embedded portion 25a, the width of the opening, which the rubber tires 13 crosses when the rubber tires 13 travel on the travel portions 25 of the mainline tracks 20A and 20B while the second guide wheels 15 can be guided in the direction along the second fixed guide rail 40, is set to be minimized within a range at which the second guide wheels 15 can be inserted.

Similar to the second fixed guide rail 40, also in the first fixed guide rail 30, an embedded portion 28, which is embedded in the travel portions 25, is provided in the portion which straddles the travel portions 25 of the mainline tracks 20A and 20B.

The switching unit 24 is disposed at an approximate center in the width directions Xa and Xb of the mainline tracks 20A and 20B, and performs switching such that the traveling direction of the vehicle 2 is set to the front-rear directions Ya and Yb along the mainline tracks 20A and 20B or to the front-rear direction Yc along the pick-up and delivery travel path 23. Specifically, when the vehicle 2 traveling on the mainline track 20A travels as it is without being switched, the switching unit 24 of the present embodiment guides the second guide wheels 15 of the vehicle 2 by the first fixed guide rail 30. Moreover, when the vehicle 2 traveling on the mainline track 20A is to travel on the pick-up and delivery travel path 23 and when the vehicle 2 traveling on the pick-up and delivery travel path 23 is to travel on the mainline track 20B, the second guide wheels 15 of the vehicle 2 are guided by the second fixed guide rail 40.

Hereinafter, the details will be described.

The switching unit 24 includes a first movable guide rail (branch guide portion and first branch rail) 50 and a second movable guide rail (branch guide portion and second branch rail) 60 which are rotatably provided around a shaft 55 which vertically extends at ends of the first fixed guide rail 30 and the second fixed guide rail 40, and a switch (moving unit) 26 which rotates the first movable guide rail 50 and the second movable guide rail 60.

The switch 26 is positioned immediately below the guide rail 21 between the two mainline tracks 20A and 20B.

In the first movable guide rail 50 and the second movable guide rail 60, the first movable guide rail 50 is provided on the side of the pick-up and delivery travel path 23 in the width directions Xa and Xb of the mainline tracks 20A and 20B, the second movable guide rail 60 is provided to be arranged with the first movable guide rail 50 at the side opposite to the pick-up and delivery travel path 23, and the first movable guide rail 50 and the second movable guide rail 60 can be integrally rotated around the shaft 55.

Figure 2:
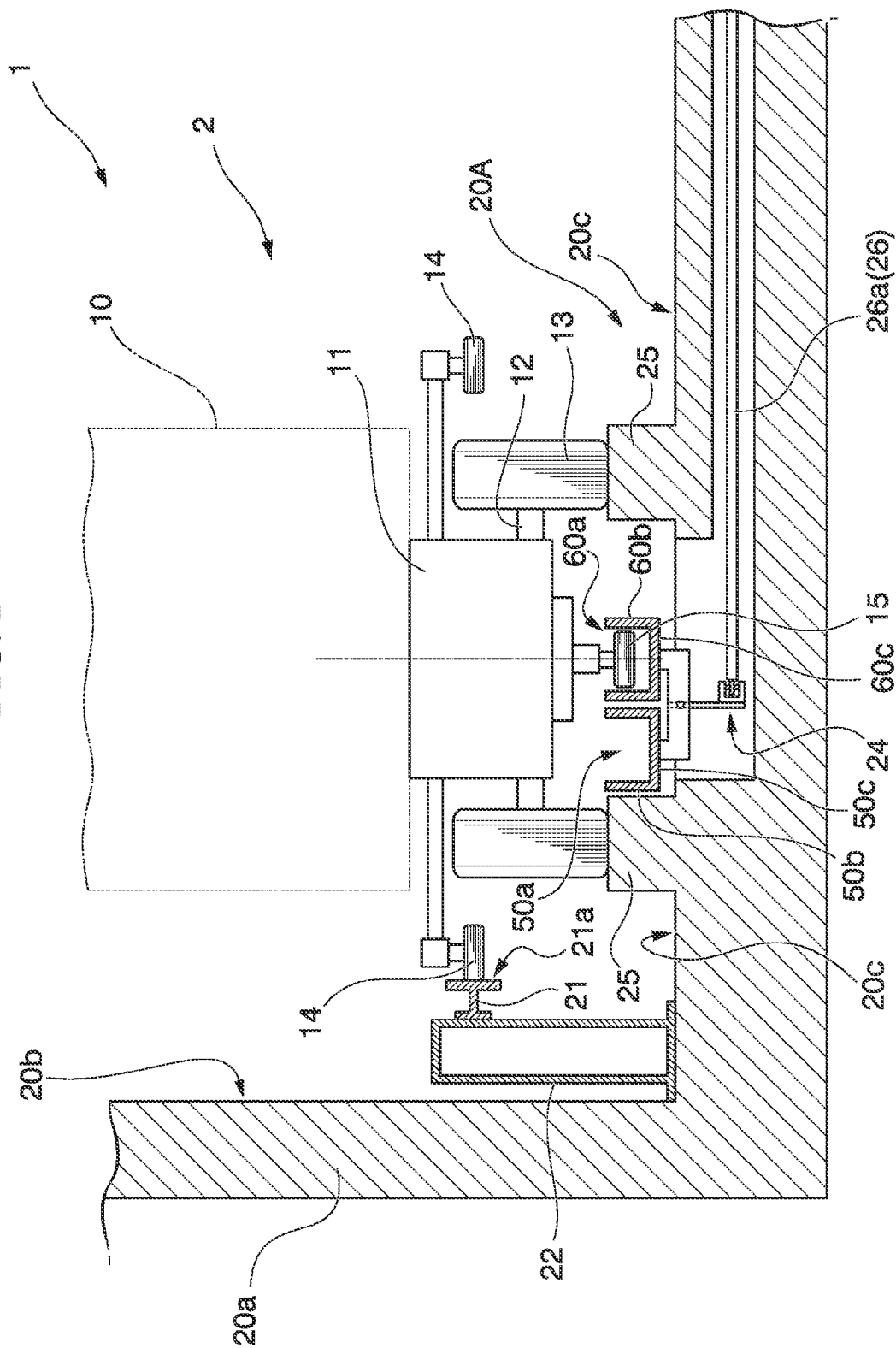
FIG. 2 is a cross-sectional view of the track-based transportation system according to the first embodiment of the present invention when viewed in a front-rear direction, and shows an A-A cross-section of FIG. 1.

As shown in FIG. 2, the first movable guide rail 50 includes a bottom portion 50c which is disposed to be approximately parallel to the bottom surface 20c, and side portions 50b which are erected from both sides of the bottom portion 50c, and a concave portion 50a is formed, which is opened upward in a longitudinal direction of the first movable guide rail 50 itself by the both side portions 50b and the bottom portion 50c, and thus the cross-section of the first movable guide rail 50 has a concave shape. The concave portion 50a guides the second guide wheels 15, which are inserted into the inner portion, with the mutual opposing surfaces of the both side portions 50b as guide surfaces.

Moreover, the second movable guide rail 60 also includes a bottom portion 60c which is disposed to be approximately parallel to the bottom surface 20c, and side portions 60b which are erected from both sides of the bottom portion 60c, and a concave portion 60a is formed, which is opened upward in a longitudinal direction of the second movable guide rail 60 itself by the both side portions 60b and the bottom portion 60c, and thus the cross-section of the second movable guide rail 60 has a concave shape. The concave portion 60a guides the second guide wheels 15, which are inserted into the inner portion, with the mutual opposing surfaces of the both side portions 60b as guide surfaces.

Here, if the first movable guide rail 50 and the second movable guide rail 60 are rotated around the shaft 55 and are positioned at a first position P1 which is a guide position to the mainline tracks 20A and 20B, the first movable guide rail 50 is disposed to be approximately parallel in the directions along the mainline tracks 20A and 20B at approximate centers in the width directions Xa and Xb of the mainline tracks 20A and 20B, and guides the second guide wheels 15 of the vehicle 2 traveling on the mainline tracks 20A and 20B to the directions along the mainline tracks 20A and 20B. Moreover, if the first movable guide rail 50 and the second movable guide rail 60 are positioned at the first position P1, the second movable guide rail 60 is positioned at a position at which the second movable guide rail 60 does not interfere with the second guide wheels 15 of the vehicle 2 traveling on the mainline tracks 20A and 20B. Accordingly, the second guide wheels 15 of the vehicle 2 traveling on the mainline tracks 20A and 20B can be guided to the front-rear directions Ya and Yb along the mainline tracks 20A and 20B.

In addition, at this time, the guide surfaces of the side portions 50b in the side of the pick-up and delivery travel path 23 of the first movable guide rail 50 are smoothly connected to the guide surface of the side portion 30b of the first fixed guide rail 30, and thus the pick-up and delivery of the second guide wheel 15 of the vehicle can be performed between the first movable guide rail 50 and the first fixed guide rail 30.

In addition, if the first movable guide rail 50 and the second movable guide rail 60 are rotated around the shaft 55 and are positioned at a second position P2 which is a guide position to the pick-up and delivery travel path 23, in the second movable guide rail 60, the end opposite to the end connected to the rotation shaft is positioned at approximate centers in the width directions Xa and Xb of the mainline tracks 20A and 20B and is disposed in the front-rear direction Yc of the pick-up and delivery travel path 23, and thus the second guide wheels 15 of the vehicle 2 traveling on the mainline tracks 20A and 20B are guided in the directions along the pick-up and delivery travel path 23. Moreover, if the first movable guide rail 50 and the second movable guide rail 60 are positioned at the second position P2, the first movable guide rail 50 is positioned at a position at which the first movable guide rail 50 does not interfere with the second guide wheels 15 of the vehicle 2 traveling on the pick-up and delivery travel path 23. Accordingly, the second guide wheels 15 of the vehicle 2 traveling on the mainline tracks 20A and 20B can be guided in the front-rear direction Yc along the pick-up and delivery travel path 23.

Moreover, at this time, the guide surfaces of the side portion 60b opposite to the side of the pick-up and delivery travel path 23 of the second movable guide rail 60 are smoothly connected to the guide surfaces of the concave portion 40a of the second fixed guide rail 40, and the pick-up and delivery of the second guide wheel 15 of the vehicle 2 can be performed between the second movable guide rail 60 and the second fixed guide rail 40.

According to the track-based transportation system 1, when the vehicle 2 traveling on the mainline track 20A of the two mainline tracks 20A and 20B approaches the pick-up and delivery travel path 23, either the rear side end of the first movable guide rail 50 or the rear side end of the second movable guide rail 60 is selected by the switch 26, and the selected end is disposed at an approximate center in the width direction Xa of the mainline track 20A. Moreover, the second guide wheels 15 of the vehicle 2 are inserted from above into the concave portion to be selected from the concave portion 50a of the first movable guide rail 50 or the concave portion 60a of the second movable guide rail 60. Accordingly, the movement of the second guide wheels 15 to both sides in the width directions Xa and Xb is regulated, the vehicle 2 is introduced to the direction of the first movable guide rail 50 or the second movable guide rail 60, and the traveling direction of the vehicle 2 is selected.

Figure 5:
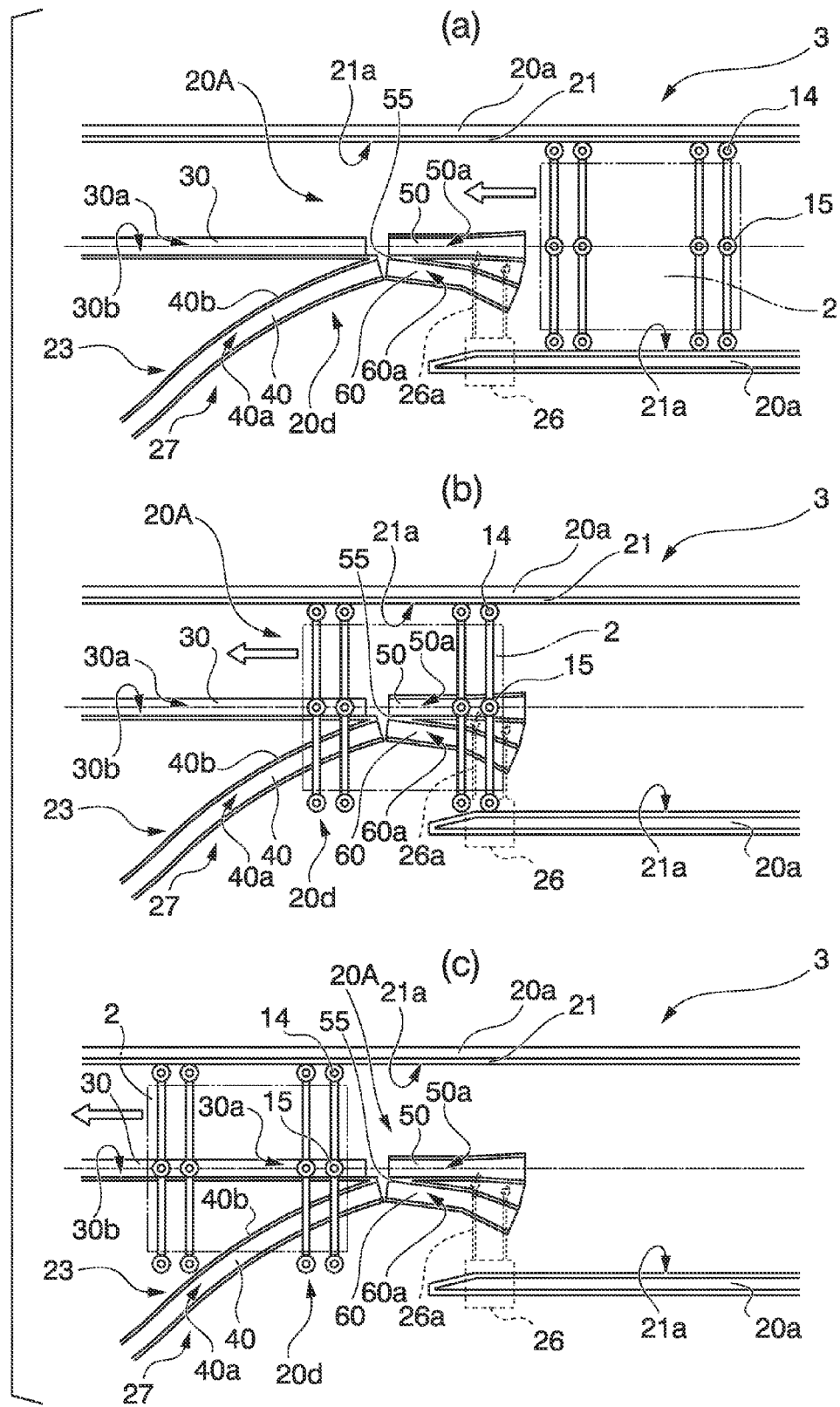
FIG. 5 shows an aspect of an operation of a switching unit of the track-based transportation system according to the first embodiment of the present invention, and shows a case in which a vehicle travels in a direction along a mainline track.

First, as shown in FIG. 5, when the first movable guide rail 50 is selected by the switch 26, that is, when the first position P1 is selected, the second guide wheels 15 are introduced from the first movable guide rail 50 to the first fixed guide rail 30, and the vehicle 2 travels on the mainline track 20A. When the second guide wheels 15 reach the first fixed guide rail 30, since the outer circumferential surfaces of the first guide wheels 14 on the right side engage with the guide rail 21 on the right side toward the traveling direction of the vehicle 2, the movement in the right direction is regulated, and since the outer circumferential surfaces of the second guide wheels 15 engage with the side portion 30b of the first fixed guide rail 30 at an approximate center in the width direction Xa, the movement in the left direction is regulated.

Here, since the left side in the traveling direction of the vehicle 2 is the branch portion 27 in which the side wall 20a is not provided, the first guide wheels 14 on the left side are in a free state in which the first guide wheels 14 are not regulated by the guide rail 21. However, due to the guide rail 21 on the right side and the first fixed guide rail 30, the vehicle 2 can travel on the mainline track 20A without meandering or the like. Moreover, at this time, the second guide wheels 15 do not interfere with the second movable guide rail 60.

Figure 6:
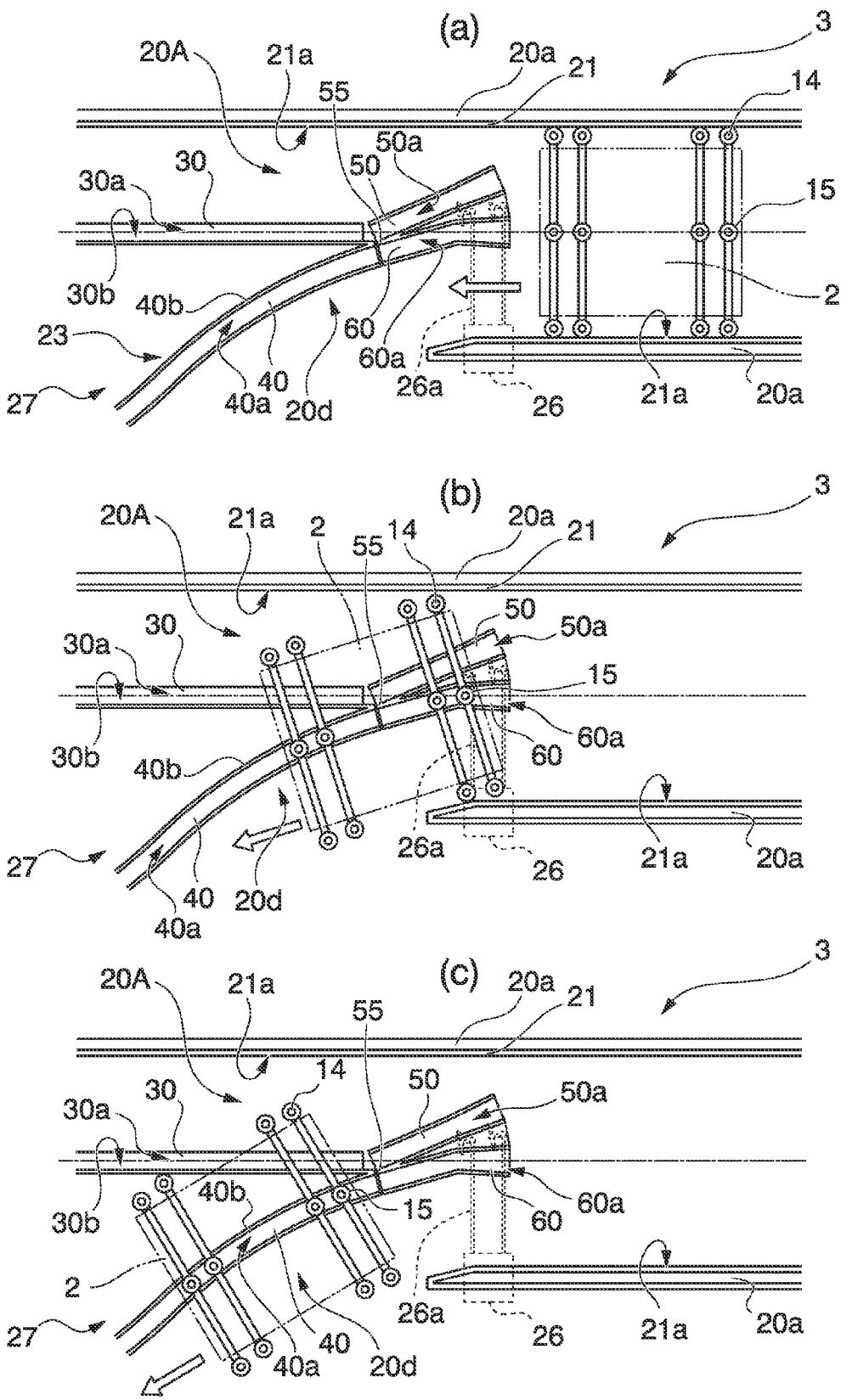
FIG. 6 shows the aspect of the operation of the switching unit of the track-based transportation system according to the first embodiment of the present invention, and shows a case in which the vehicle travels in a direction along a pick-up and delivery travel path.

Next, as shown in FIG. 6, when the second movable guide rail 60 is selected by the switch 26, that is, when the second position P2 is selected, the second guide wheels 15 are introduced from the second movable guide rail 60 to the second fixed guide rail 40, and the vehicle 2 travels on the pick-up and delivery travel path 23. When the second guide wheels 15 reach the second fixed guide rail 40, the second guide wheels 15 are inserted into the concave portion 40a of the second fixed guide rail 40 from above.

Here, since the side wall 20a is not provided in the pick-up and delivery travel path 23, the first guide wheels 14 of the vehicle 2 are not regulated by the guide rail 21 and are in a free state. However, since the movement of the second guide wheels 15 is regulated from both sides in the width direction Xa by the concave portion 40a of the second fixed guide rail 40, the vehicle 2 can travel on the pick-up and delivery travel path 23 without meandering or the like. Moreover, at this time, the second guide wheels 15 do not interfere with the first movable guide rail 50.

In addition, the second fixed guide rail 40 is provided at an approximate center in the width direction Xc of the pick-up and delivery travel path 23 on the bottom surface 23c of the pick-up and delivery travel path 23.

When a pair of second fixed guide rails 40 are provided on both sides in the width direction Xc of the pick-up and delivery travel path 23 and a pair of second guide wheels 15 provided on both sides in the width direction X of the vehicle 2 are guided by the pair of second fixed guide rails 40, the pick-up and delivery in the left and right of the second guide wheels 15 are needed. However, the required pick-up and delivery in the left and right are not needed in the present embodiment. Accordingly, a section in which left and right second fixed guide rails 40, which are provided to always maintain a state in which the vehicle 2 is guided, overlap, or an overlap section can be reduced. In addition, the size in which the pick-up and delivery travel path 23 is added to the size in width directions Xa and Xb of two mainline tracks 20A and 20B, or a width between double-line tracks of the vehicle pick-up and delivery device 3 is reduced, and an occupation range in the width direction can be suppressed.

Moreover, since the first movable guide rail 50 and the second movable guide rail 60 are disposed at approximate centers in the width directions Xa and Xb of the mainline tracks 20A and 20B, in the mainline tracks 20A and 20B, the switches 26 can be shifted and installed at the approximate centers in the width directions Xa and Xb of the mainline tracks 20A and 20B. Accordingly, in the vehicle pick-up and delivery device 3, an installation space of the switch 26 need not be separately provided to protrude in the width directions Xa and Xb from the mainline tracks 20A and 20B of the pick-up and delivery device 3, and also according to this, the occupation range in the track-width direction of the vehicle pick-up and delivery device 3 is suppressed.

Moreover, compared to the case in which the first movable guide rail 50 and the second movable guide rail 60 are provided on both side portions of the mainline tracks 20A and 20B, a stroke amount of an actuator 26a of the switch 26 can be decreased. Moreover, it is necessary to dispose the switch 26 at a position which is separated from the first movable guide rail 50 and the second movable guide rail 60 by the minimum stroke amount of the actuator 26a. However, in the present embodiment, in the mainline tracks 20A and 20B, it is possible to shift and install the switch 26 at the approximate centers in the width directions Xa and Xb of the mainline tracks 20A and 20B. Accordingly, the occupation range in the track-width direction in the installation place of the switching unit 24 can be further suppressed.

In one mainline track 20A, the switch 26 is disposed at the left side in the traveling direction of the vehicle 2, and thus a force in a pushing direction acts on the actuator 26a of the switch 26 from the second guide wheels 15 of the vehicle 2 while the second guide wheels 15 are guided by the second movable guide rail 60. However, at this time, since the vehicle 2 is supported by the guide rail 21 on the left side, it can be avoided that only the actuator 26a is subjected to the entire force. Accordingly, a lock pin or the like, which regulates the operation of the actuator 26a, need not be separately provided in the switch 26 in order to prevent damage of the actuator 26a, and the structure of the switch 26 can be simplified.

Here, an abutting member or the like, which abuts the first movable guide rail 50 from the right side in the traveling direction of the vehicle 2, is provided, and thus a force in a tensile direction acting on the actuator 26a can be prevented, and damage can be avoided.

Similarly, in the other mainline track 20B, a force in a pushing direction acts on the actuator 26a of the switch 26 while the second guide wheels 15 are guided by the second movable guide rail 60. However, since the vehicle 2 is supported by the guide rail 21 on the right side in the traveling direction of the vehicle 2, it can be avoided that only the actuator 26a is subjected to the entire force. Moreover, similarly, an abutting member or the like, which abuts the first movable guide rail 50 from the left side in the traveling direction of the vehicle 2, is provided, and thus a force in a tensile direction acting on the actuator 26a can be prevented.

While the vehicle 2 travels on the pick-up and delivery travel path 23, when the vehicle 2 straddles the embedded portion 25a of the travel portion 25, impact can be minimized due to the extension 40d of the second fixed guide rail 40.

Moreover, since the second fixed guide rail 40 is provided at the approximate center in the width direction Xc of the pick-up and delivery travel path 23, the second guide wheels 15 of the vehicle 2 can be installed at the approximate center below the vehicle 2. Moreover, even when the front and the rear of the vehicle 2 with respect to the traveling direction are changed, the vehicle 2 can travel on the pick-up and delivery travel path 23, and the pick-up and delivery of the vehicle 2 from one mainline track 20A to the other mainline track 20B can be performed.

In the track-based transportation system 1 of the present embodiment, since the second fixed guide rail 40 is disposed at the approximate center in the width direction Xc of the pick-up and delivery travel path 23, the width between the double-line tracks of the vehicle pick-up and delivery device 3 is reduced, and the occupation range of the track width in the width direction can be suppressed. Since the second movable guide rails 60 are disposed at the approximate centers in the width directions Xa and Xb of the mainline tracks 20A and 20B, the switches 26 can be installed to be close to the centers in the width directions Xa and Xb of the mainline tracks 20A and 20B, and thus the occupation range in the width direction of the vehicle pick-up and delivery device 3 can be suppressed while the second guide wheels 15 of the vehicle 2 are similarly used and can pass through the branch portion 27.

Moreover, since the structure of the switch 26 is simplified, durability improvement, maintenance improvement, cost reduction, and the like can be achieved.

In the pick-up and delivery travel path 23, impact can be minimized due to the extension 40d of the second fixed guide rail 40, and comfort and safety at the time of the traveling are improved.

Moreover, since the second fixed guide rail 40 is provided at the approximate center in the width direction Xc of the pick-up and delivery travel path 23, even when the vehicles 2 are changed in the front-rear direction Y, the vehicle 2 can travel in the pick-up and delivery travel path 23, and thus limitation on the operation of the vehicle 2 is decreased.

Here, the switching unit 24 may not be provided at the centers in the width directions Xa and Xb of the mainline tracks 20A and 20B. Specifically, the first movable guide rail 50 and the second movable guide rail 60 are provided on both sides in the width directions Xa and Xb of the mainline tracks 20A and 20B, and in the vehicle 2, the second guide wheels 15 may be installed at three places such as the center below the traveling device 11 and both sides in the width directions Xa and Xb.

Also in this case, the vehicle can securely travel on the pick-up and delivery travel path 23 while the width between the double-line tracks of the vehicle pick-up and delivery device 3 is reduced and the occupation range of the track width is suppressed.

Moreover, the cross-section of the first fixed guide rail 30 is an L shape. However, for example, similar to the first movable guide rail 50 and the second movable guide rail 60, the first fixed guide rail may have a concave cross-sectional shape in which a concave portion is formed. In this case, since the second guide wheels 15 can be regulated from both sides in the width directions Xa, Xb, and Xc, the vehicle 2 can be more securely guided in the directions of the mainline tracks 20A and 20B.

The first movable guide rail 50 and the second movable guide rail 60 are members having concave cross-sectional shapes in which concave portions 50a and 60a are formed. However, similar to the first fixed guide rail 30, the first movable guide rail 50 and the second movable guide rail 60 may have L-shaped cross-sections. In this case, in the mainline track 20A, the first movable guide rail 50 is disposed to regulate the second guide wheels 15 from the left side in the traveling direction of the vehicle 2, and the second movable guide rail 60 is disposed to regulate the second guide wheels 15 from the right side in the traveling direction of the vehicle 2. In this case, since the vehicle 2 is guided from both sides in the width direction Xa and Xb by one of the left and right guide rails 21 in a side guide type and the first movable guide rail 50 or the second movable guide rail 60, this case is similar to the configuration in which the vehicle 2 is guided by two guide rails 21.

Moreover, the second guide wheels 15 may not be installed at the approximate center in the width direction X of the vehicle 2, and may be disposed at a position which is deviated from the center to either the left or the right in the width direction X. In this case, in order to correspond to the second guide wheels 15, the first fixed guide rail 30 and the second fixed guide rail 40, and the first movable guide rail 50 and the second movable guide rail 60 should be deviated from the approximate centers in the width directions Xa and Xb of the mainline tracks 20A and 20B and the pick-up and delivery travel path 23.

In this case, for example, an underfloor device such as an Automatic Train Control (ATC) device disposed below the vehicle 2 can be disposed at the approximate center in the width direction X of the vehicle 2.

Figure 7:
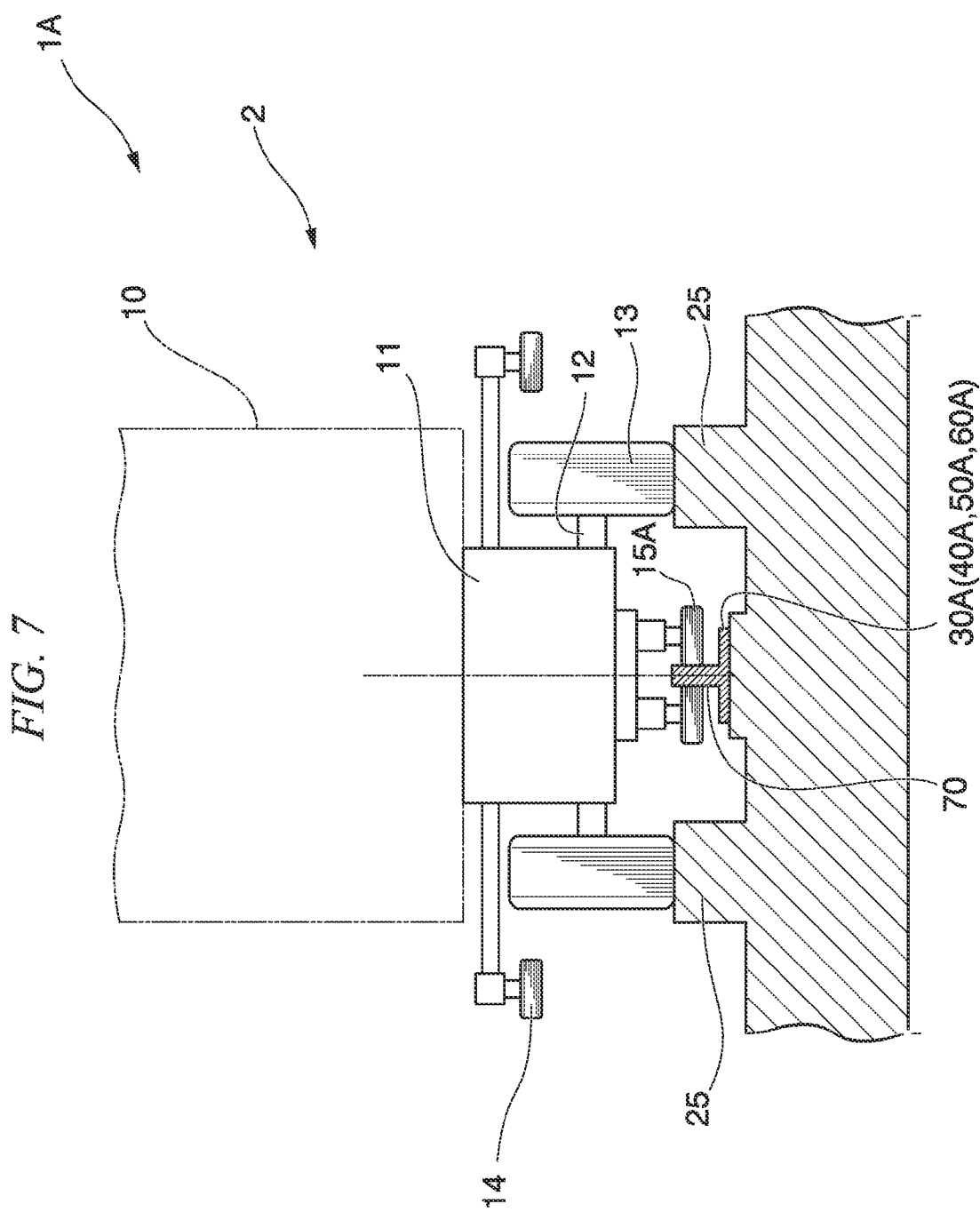
FIG. 7 is a cross-sectional view of a track-based transportation system according to a second embodiment of the present invention when viewed in the front-rear direction.

Next, with reference to FIG. 7, a track-based transportation system 1A according to a second embodiment of the present invention will be described.

The same reference numbers are attached to the same components as the first embodiment, and detailed descriptions thereof are omitted here.

In the present embodiment, cross-sectional shapes of a first fixed guide rail 30A and a second fixed guide rail 40A and cross-sectional shapes of a first movable guide rail 50A and a second movable guide rail 60A in the vehicle pick-up and delivery device 3, and the configurations of second guide wheels 15A in the vehicle 2 are different from the first embodiment.

The second guide wheels 15A are provided to protrude from the lower portion of the vehicle 2, that is, the lower portion of the traveling device 11 at a position interposed by two left and right rubber tires 13 in the center between the first guide wheels 14 on the right side and on the left side. Moreover, the second guide wheels 15A are guide rollers which are horizontally installed symmetrically by two with a gap at the same position in the width direction X from the center of the vehicle 2, and can be rotated about the shaft extending in the vertical direction.

In the first fixed guide rail 30A and the second fixed guide rail 40A, and the first movable guide rail 50A and the second movable guide rail 60A, a convex portion 70 protruding upward is formed, and the cross-sectional shapes of the rails have reverse T shapes.

According to the track-based transportation system 1A, the convex portions 70 of the first fixed guide rail 30A and the second fixed guide rail 40A, and the first movable guide rail 50A and the second movable guide rail 60A are interposed from both sides in the width directions Xa, Xb, and Xc by the second guide wheels 15A which are horizontally provided symmetrically by two, and thus the movement of the vehicle 2 to the both sides in the width directions Xa, Xb, and Xc can be regulated.

Similar to the first embodiment, in the track-based transportation system 1A of the present embodiment, the second fixed guide rail 40A and the second movable guide rail 60A are disposed at approximate centers in the width directions Xa, Xb, and Xc of the mainline tracks 20A and 20B and the pick-up and delivery travel path 23, and thus the above-described overlap section can be reduced, the installation position of the switch 26 can be shifted to the centers in the width directions Xa and Xb of the mainline tracks 20A and 20B, the width between double-line tracks of the vehicle pick-up and delivery device 3 can be reduced, and the occupation range in the track width can be suppressed.

In addition, the convex portion 70 is interposed by the second guide wheels 15, and thus the vehicle 2 travels while more securely suppressing the meandering or the like of the vehicle 2, and the vehicle 2 traveling in either the directions along the mainline tracks 20A and 20B or the direction along the pick-up and delivery travel path 23 can be selected by the switching unit 24.

In the present embodiment, in the first fixed guide rail 30A and the second fixed guide rail 40A, and the first movable guide rail 50A and the second movable guide rail 60A, the convex portion 70 which protrudes upward is formed. However, conversely, the convex portion 70 may be formed so as to protrude downward and have a T-shaped cross-section.

In this case, in addition to the regulation to the second guide wheels 15A in the width directions Xa, Xb, and Xc, the second guide wheels 15A can be regulated from above.

Moreover, similar to the first embodiment, the second guide wheels 15A, the first fixed guide rail 30A, the second fixed guide rail 40A, the first movable guide rail 50A, and the second movable guide rail 60A may not be installed at the approximate centers in the width directions Xa, Xb, and Xc of the vehicle 2, and may be disposed at positions which are deviated from the centers to either the left or the right in the width directions Xa, Xb, and Xc.

Figure 8:
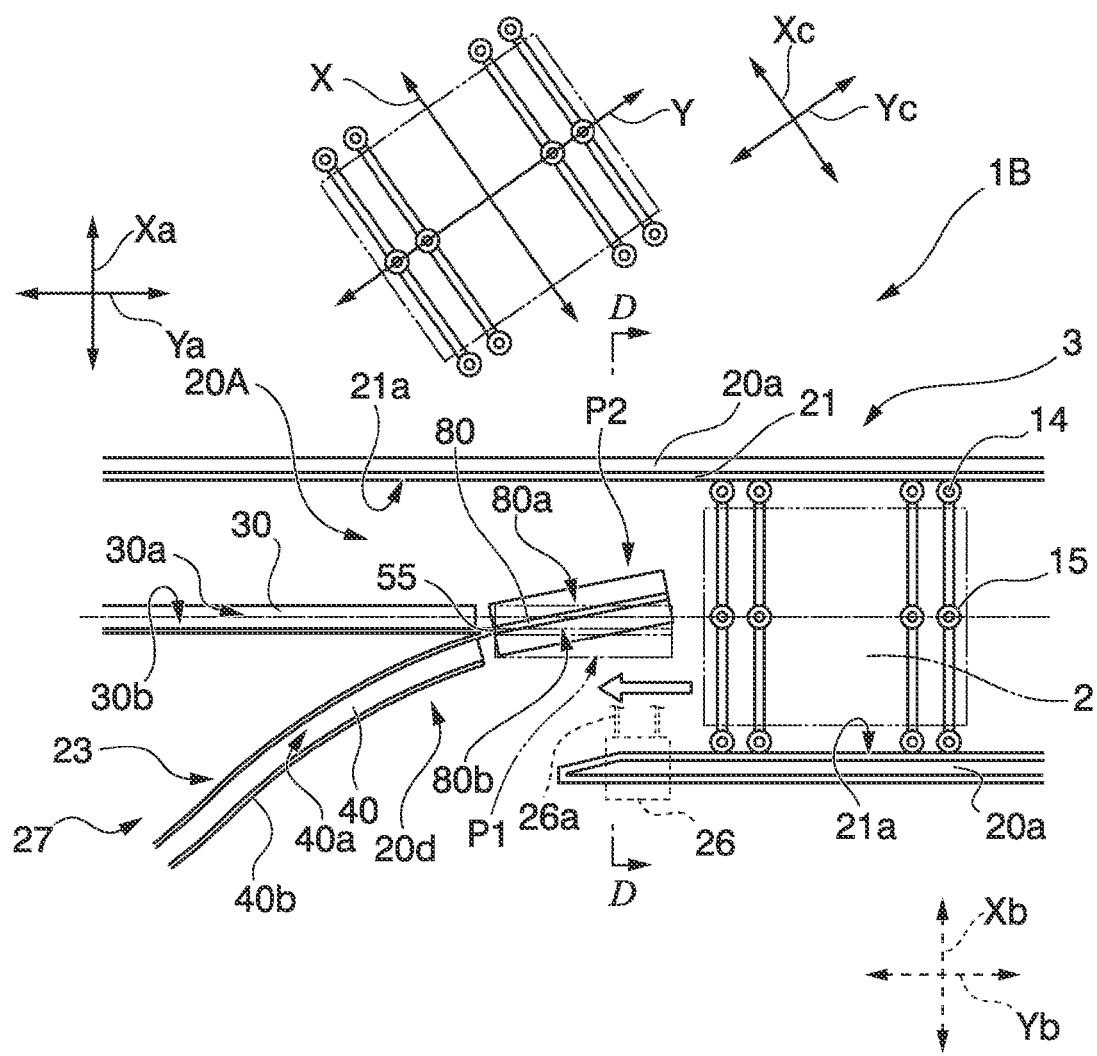
FIG. 8 is a view of a track-based transportation system according to a third embodiment of the present invention when viewed from above.
Figure 9:
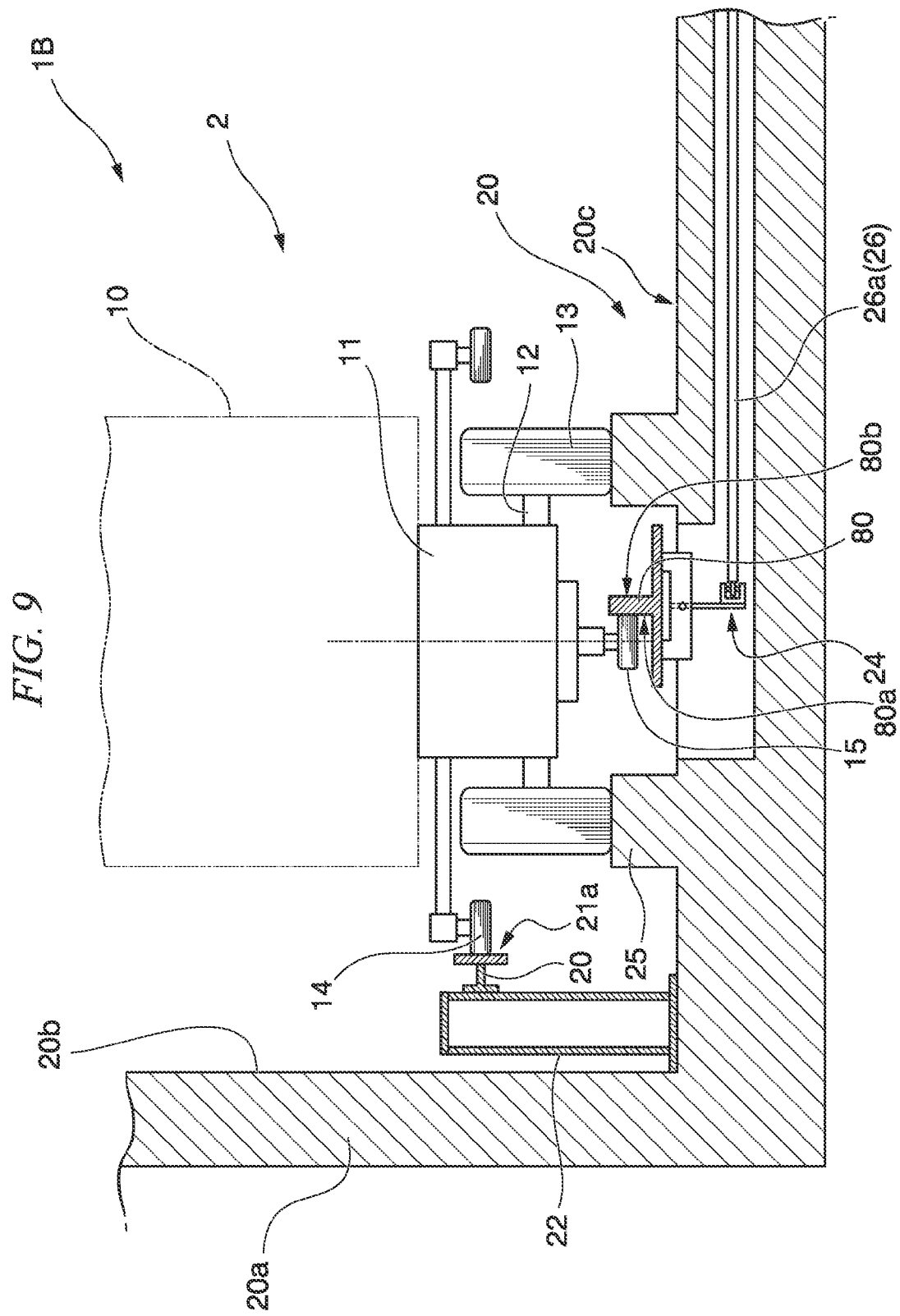
FIG. 9 is a cross-sectional view of the track-based transportation system according to the third embodiment of the present invention when viewed in the front-rear direction, and shows the same position as a D-D cross-section of FIG. 8.

Next, with reference to FIGS. 8 and 9, a track-based transportation system 1B according to a third embodiment of the present invention will be described.

The same reference numbers are attached to the same components as the first embodiment and the second embodiment, and detailed descriptions thereof are omitted here.

The present embodiment has the track-based transportation system 1 of the first embodiment as a basic configuration, and is different from the first embodiment and the second embodiment in that the first movable guide rail 50 and the second movable guide rail 60 in the switching unit 24 are substituted with a movable guide rail (branch guide portion) 80 which is integrated by the first movable guide rail 50 and the second movable guide rail 60.

In the movable guide rail 80, a convex portion protruding upward is formed, the cross-sectional shape has a reverse T shape, a surface facing the side of the pick-up and delivery travel path 23 in the width directions Xa and Xb of the mainline tracks 20A and 20B of the convex portion is a first guide surface 80a which configures one branch guide portion, and a surface facing the side opposite to the pick-up and delivery travel path 23 is a second guide surface 80b which configures the other branch guide portion. The outer circumferential surfaces of the second guide wheels 15 each contact the first guide surface 80a and the second guide surface 80b from the left and the right in the width directions Xa and Xb, and the second guide wheels 15 roll to be guided.

Here, if the movable guide rail 80 is rotated around the shaft 55 and positioned at the first position P1 which is a guide position to the mainline tracks 20A and 20B, the first guide surface 80a is disposed to be approximately parallel in the directions along the mainline tracks 20A and 20B at approximate centers in the width directions Xa and Xb of the mainline tracks 20A and 20B, and guides the second guide wheels 15 of the vehicle 2 traveling on the mainline tracks 20A and 20B in the front-rear directions Ya and Yb along the mainline tracks 20A and 20B.

At this time, the first guide surface 80a is smoothly connected to the guide surface of the side portion 30b of the first fixed guide rail 30, and thus the pick-up and delivery of the second guide wheel 15 of the vehicle can be performed between the first guide surface 80a and the first fixed guide rail 30.

Moreover, when the movable guide rail 80 is rotated around the shaft 55 and positioned at the second position P2 which is a guide position to the pick-up and delivery travel path 23, in the second guide surface 80b, the end opposite to the end connected to the shaft 55 is positioned at approximate centers in the width directions Xa and Xb of the mainline tracks 20A and 20B and is disposed in the front-rear direction Yc of the pick-up and delivery travel path 23, and thus the second guide wheels 15 of the vehicle 2 traveling on the mainline tracks 20A and 20B can be guided in the front-rear direction Yc along the pick-up and delivery travel path 23.

At this time, the second guide surface 80b is smoothly connected to the guide surface of the second fixed guide rail 40, and thus the pick-up and delivery of the second guide wheel 15 of the vehicle 2 can be performed between the second guide surface 80b and the second fixed guide rail 40.

According to the track-based transportation system 1B, when the vehicle 2 traveling on one mainline track 20A of the two mainline tracks 20A and 20B approaches the pick-up and delivery travel path 23, either the first guide surface 80a or the second guide surface 80b of the movable guide rail 80 is selected by the switch 26, and the selected surface is disposed at an approximate center in the width direction Xa of the mainline track 20A. The second guide wheels 15 are regulated from the width directions Xa and Xb by the first guide surface 80a or the second guide surface 80b, the second guide wheels 15 are guided to either the first guide surface 80a or the second guide surface 80b, and thus the traveling direction of the vehicle 2 is selected.

When the vehicle 2 travels in the direction along the mainline track 20A, the first guide surface 80a regulates the second guide wheels 15 from the left side in the traveling direction in the vehicle 2 in the width direction Xa, the guide surface 21a of the guide rail 21 on the right side in the traveling direction of the vehicle 2 regulates the first guide wheels 14 from the right side, and thus an unrestricted state in which the vehicle 2 can move to either side in the width direction Xa does not occur.

Moreover, when the vehicle 2 travels in the direction along the pick-up and delivery travel path 23, the second guide surface 80b regulates the second guide wheels 15 from the right side in the traveling direction in the vehicle 2 in the width direction Xa, the guide surface 21a of the guide rail 21 on the left side in the traveling direction of the vehicle 2 regulates the first guide wheels 14 from the left side, and thus the vehicle does not become unrestricted.

Similar to the first embodiment and the second embodiment, in the track-based transportation system 1B of the present embodiment, the movable guide rail 80 is disposed at approximate centers in the width directions Xa, Xb, and Xc of the mainline tracks 20A and 20B and the pick-up and delivery travel path 23, and thus it is not necessary to separately provide the installation space of the movable guide rail 80 and the space for securing the movable range in the outside of the width directions Xa and Xb. Moreover, the switches 26 can also be installed to be close to the centers in the width directions Xa and Xb of the mainline tracks 20A and 20B. Accordingly, the occupation range in the width direction at the installation space of the switching unit 24 can be suppressed.

In addition, since the movable guide rail 80 is configured of an integral structure, durability improvement, maintenance improvement, cost reduction, and the like can be achieved.

Next, with reference to FIGS. 10 to 14, a track-based transportation system 1C according to a fourth embodiment of the present invention will be described.

The same reference numbers are attached to the same components as the first embodiment to the third embodiment, and detailed descriptions thereof are omitted here.

The present embodiment has the track-based transportation system 1 of the first embodiment as a basic configuration, the configurations of second guide wheels 15B, guide rails (first guide portions) 91, a switching unit 94, and a second fixed guide rail 96 are different from the first embodiment, and a mainline track guide rail 95 is provided instead of the first fixed guide rail 30.

Figure 10:
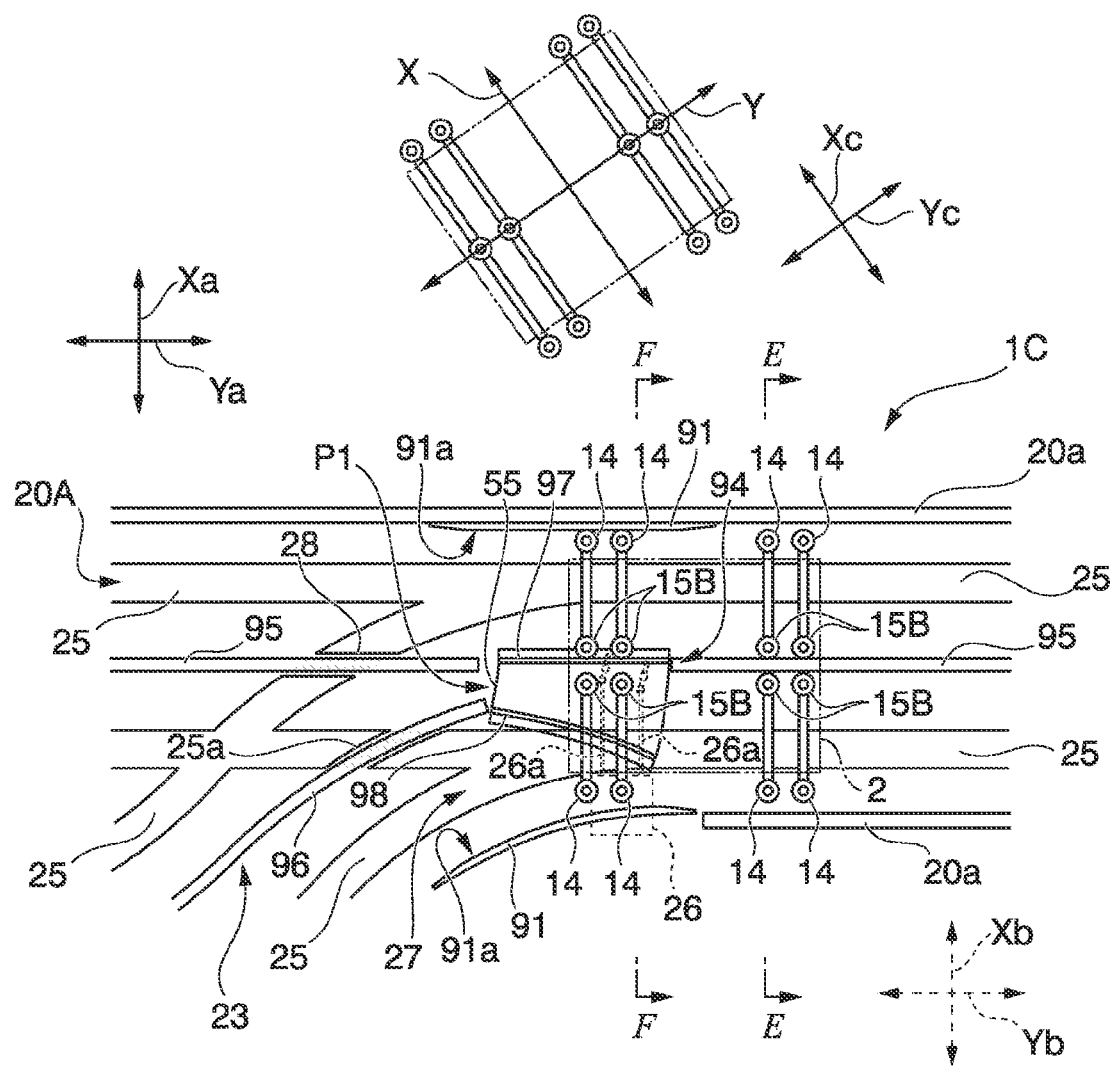
FIG. 10 is a view of a track-based transportation system according to a fourth embodiment of the present invention when viewed from above, and shows a case in which a vehicle travels in a direction along a mainline track.
Figure 11:
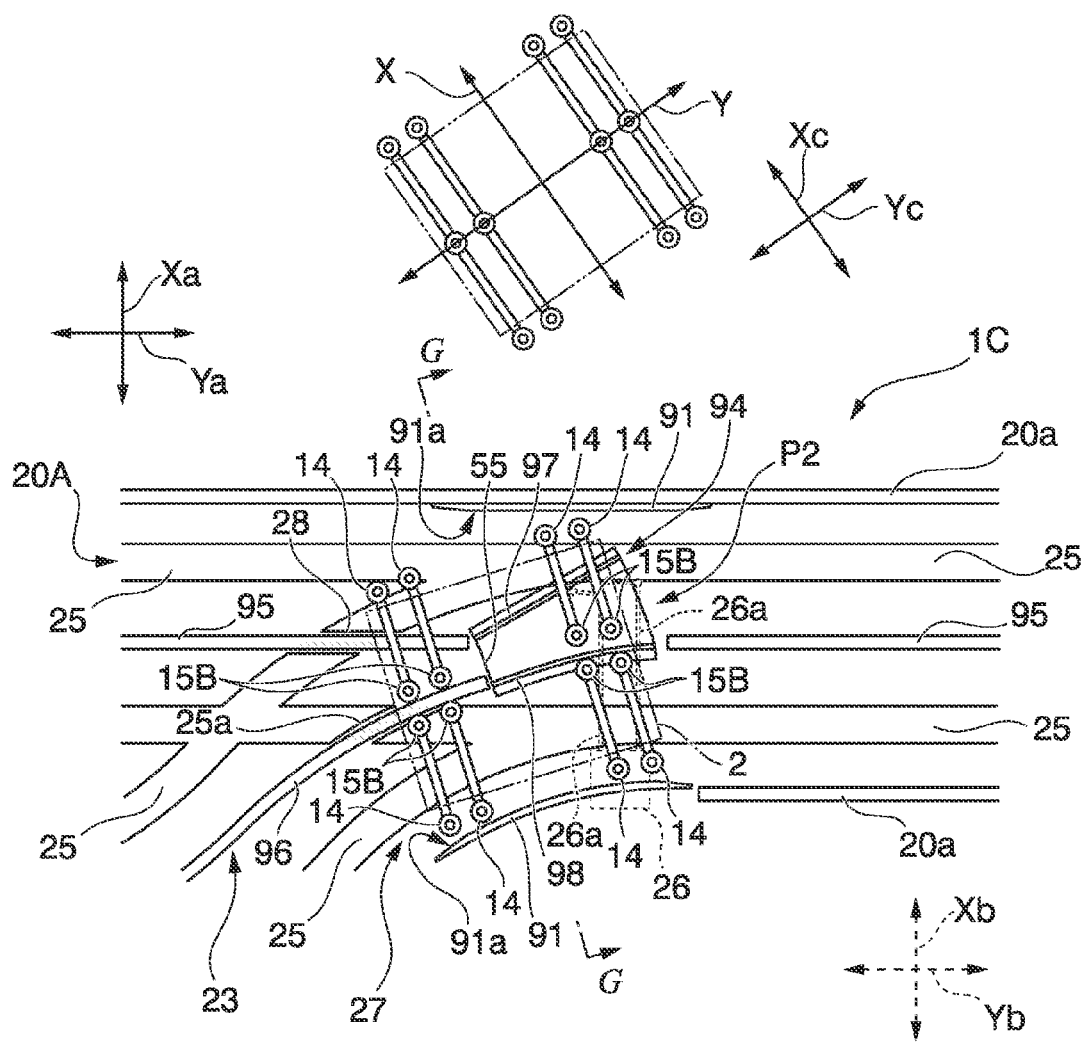
FIG. 11 is a view of a track-based transportation system according to a fourth embodiment of the present invention when viewed from above, and shows a case in which the vehicle travels in a direction along a pick-up and delivery travel path.

As shown in FIGS. 10 and 11, the second guide wheels 15B are provided to protrude from the lower portion of the vehicle 2, that is, the lower portion of the traveling device 11 at a position interposed by two left and right rubber tires 13 in the center between the first guide wheels 14 on the right side and on the left side. Moreover, the second guide wheels 15B are guide rollers which are horizontally installed symmetrically by two with a gap at the same position in the width direction X from the center of the vehicle 2, and can be rotated about the shaft extending in the vertical direction.

The mainline track guide rails 95 extend in the directions along the mainline tracks 20A and 20B at approximate centers in the width directions Xa and Xb in the mainline tracks 20A and 20B, and can guide the second guide wheels 15B of the vehicle 2 in the directions along the mainline tracks 20A and 20B.

That is, the track-based transportation system 1C of the present embodiment is a center guide type in which the vehicle 2 travels to be guided by the mainline track guide rail 95 which is provided at the approximate centers in the width directions Xa and Xb.

Figure 12:
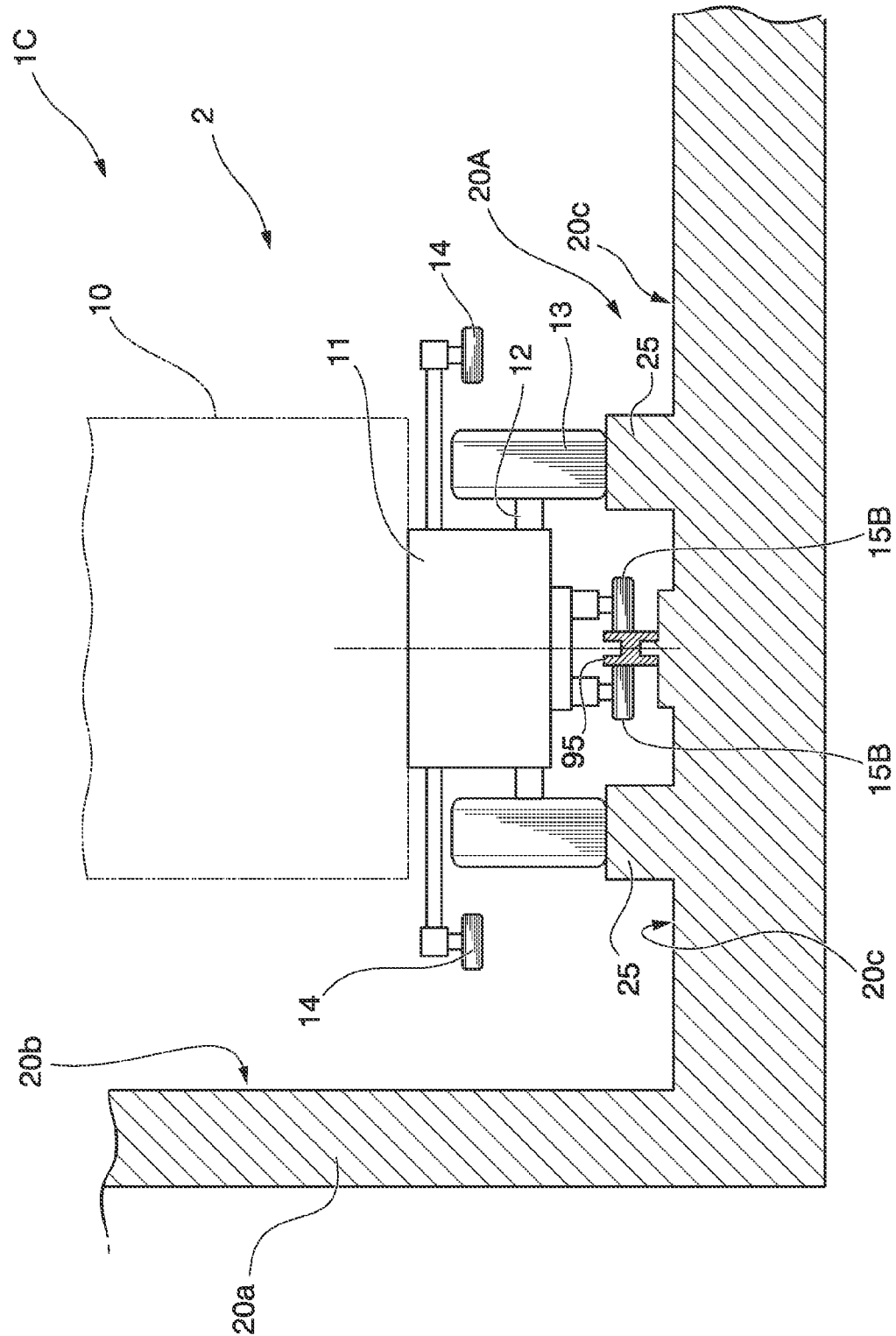
FIG. 12 is a cross-sectional view of the track-based transportation system according to the fourth embodiment of the present invention when viewed in a front-rear direction, and shows an E-E cross-section of FIG. 10.

Moreover, as shown in FIG. 12, the mainline track guide rail 95 has an H-shaped cross-section, and the surfaces facing the width directions Xa and Xb are guide surfaces which guide the second guide wheels 15B. In addition, the mainline track guide rail 95 is interposed by the two second guide wheels 15B from both sides in the width directions Xa and Xb, and thus the movement of the vehicle 2 to the both sides in the width directions Xa and Xb is regulated. Moreover, the mainline track guide rail 95 is not provided at a position at which the switching unit 94 is installed, and is partially divided.

The second fixed guide rail 96 is disposed at approximately the same position as the second fixed guide rail 40 of the first embodiment and has an H-shaped cross-section similar to the mainline track guide rail 95, and the surface facing the width direction Xc is a guide surface which guides the second guide wheels 15B. In addition, the second fixed guide rail 96 is interposed by the two second guide wheels 15B from both sides in the width direction Xc, and thus the movement of the vehicle 2 to the both sides in the width direction Xc is regulated.

Figure 13:
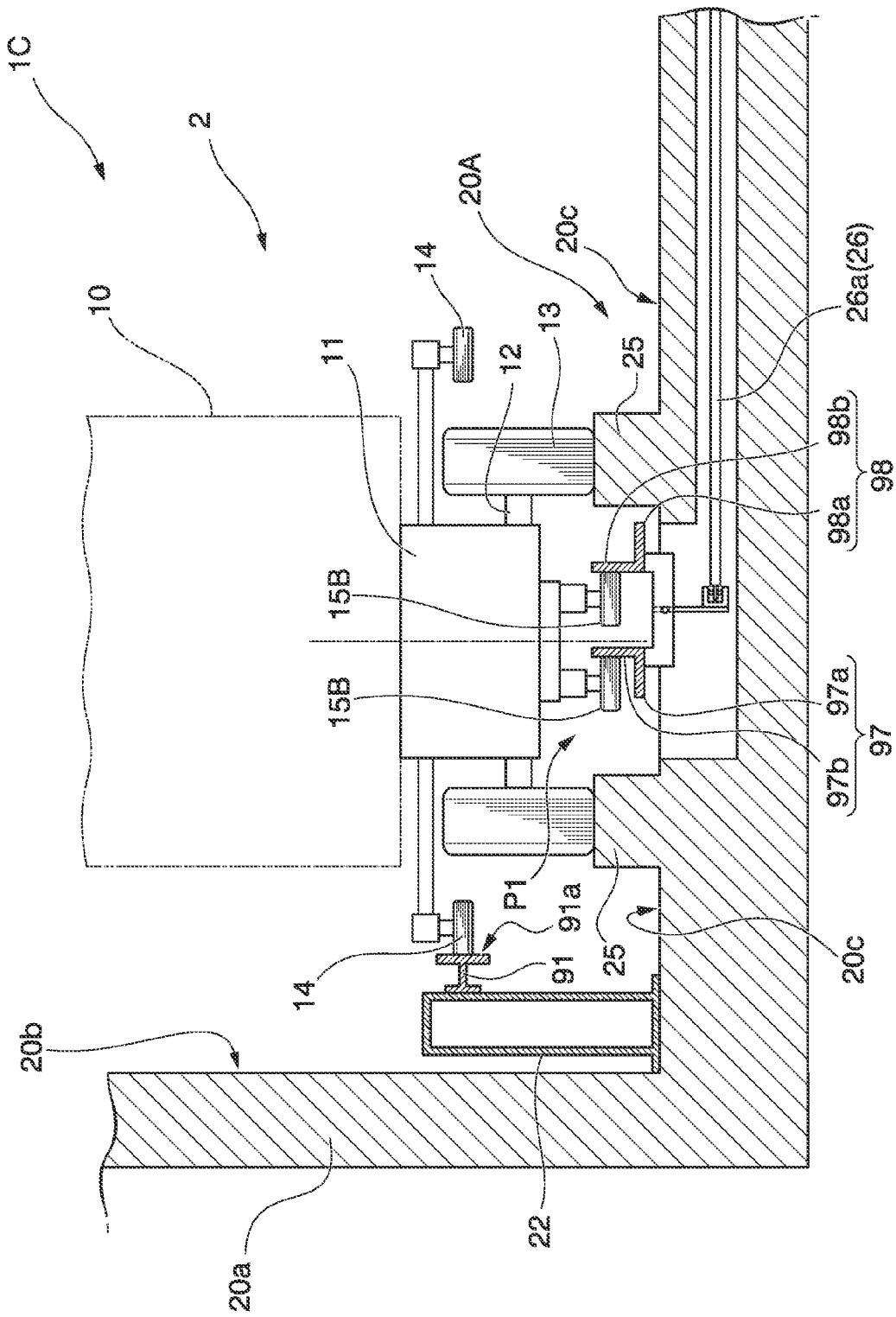
FIG. 13 is a cross-sectional view of the track-based transportation system according to the fourth embodiment of the present invention when viewed in a front-rear direction, and shows an F-F cross-section of FIG. 10 and a case in which a branch guide portion is disposed at a first position.
Figure 14:
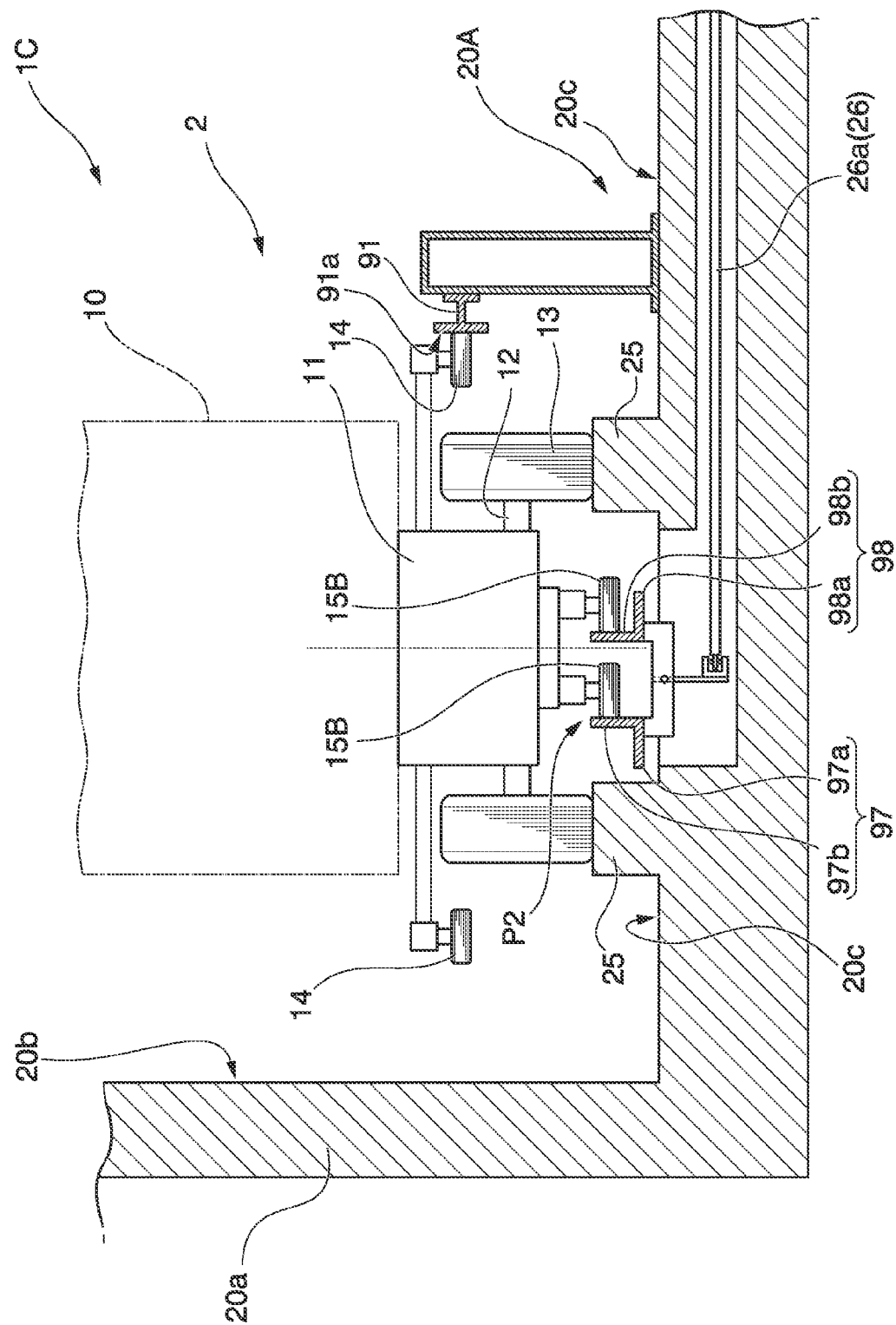
FIG. 14 is a cross-sectional view of the track-based transportation system according to the fourth embodiment of the present invention when viewed in a front-rear direction, and shows a G-G cross-section of FIG. 11 and a case in which the branch guide portion is disposed at a second position.

Moreover, as shown in FIGS. 13 and 14, similar to the switching unit 24, the switching unit 94 includes a first movable guide rail (branch guide portion and first branch rail) 97, a second movable guide rail 98 (branch guide portion and second branch rail), and a switch 26.

The cross-sectional shape of the first movable guide rail 97 is an L shape. That is, the first movable guide rail 97 includes a bottom portion 97a parallel to the bottom surface 20c of each of the mainline tracks 20A and 20B, and a side portion 97b which is provided to protrude upward from the inner side (the right side of the paper surface of FIGS. 13 and 14) of each of the width directions Xa and Xb of the bottom portion 97a, and forms a guide surface on which the second guide wheel 15B contacts and rolls.

Similar to the first movable guide rail 97, the cross-sectional shape of the second movable guide rail 98 is an L shape, that is, the second movable guide rail 98 includes a bottom portion 98a parallel to the bottom surface 20c of each of the mainline tracks 20A and 20B, and a side portion 98b which is provided to protrude upward from the inner side (the left side toward the paper surface of FIGS. 13 and 14) of each of the width directions Xa and Xb of the bottom portion 98a, and forms a guide surface on which the second guide wheel 15B contacts and rolls.

Moreover, when the first movable guide rail 97 and the second movable guide rail 98 are positioned at the first position P1, the guide surface, which is positioned at the right side in the traveling direction of the vehicle 2 in the mainline track guide rail 95, is smoothly connected to the guide surface of the side portion 97b of the first movable guide rail 97. In this way, the vehicle can be guided in the front-rear directions Ya and Yb along the mainline tracks 20A and 20B.

In addition, when the first movable guide rail 97 and the second movable guide rail 98 are positioned at the second position P2, the guide surface, which is positioned at the left side in the traveling direction of the vehicle 2 in the mainline track guide rail 95, is smoothly connected to the guide surface of the side portion 98b of the second movable guide rail 98. In this way, the vehicle can be guided in the front-rear direction Yc along the pick-up and delivery travel path 23.

Moreover, a gap, through which the second guide wheel 15B can just pass, is formed between the side portion 97b of the first movable guide rail 97 and the side portion 98b of the second movable guide rail.

The guide rail 91 has approximately the same configuration as the guide rail 21 of the first embodiment, the outer circumferential surfaces of the first guide wheels 14 contact a guide surface 91a of the guide rail 91, and thus the vehicle 2 is guided. Moreover, the guide rails 91 are provided only at the position in which the first movable guide rail 97 and the second movable guide rail 98 are installed, that is, only at the position in which the direction of the vehicle 2 is switched by the switching unit 94. Here, the guide rail 91 of the side of the pick-up and delivery travel path 23 is installed in the front-rear direction Yc, and the guide rails 91 of the sides of the mainline tracks 20A and 20B are installed in the front-rear directions Ya and Yb.

According to the track-based transportation system 1C, when the vehicle 2 traveling on the mainline track 20A approaches the pick-up and delivery travel path 23, the first movable guide rail 97 and the second movable guide rail 98 are rotated around the shaft 55 by the switch 26, and thus the vehicle 2 is introduced onto either the mainline track 20A or the pick-up and delivery travel path 23.

Specifically, as shown in FIG. 10, when the first movable guide rail 97 is selected by the switch 26, that is, the first position P1 is selected, the guide surfaces of the mainline track guide rail 95 and the first movable guide rail 97 are connected to each other, the second guide wheels 15 are introduced from the mainline track guide rail 95 to the mainline track guide rail 95 again via the first movable guide rail 97, and thus the vehicle 2 travels on the mainline track 20A.

At this time, the outer circumferential surfaces of the first guide wheels 14 on the right side engage with the guide surface 91a of the guide rail 91 on the right side toward the traveling direction of the vehicle 2, and the outer circumferential surfaces of the second guide wheels 15B on the right side in the traveling direction engage with the first movable guide rail 97. In this way, the movement of the vehicle 2 to both sides in the width direction Xa is regulated.

Moreover, since the second guide wheels 15B on the left side in the traveling direction pass between the first movable guide rail 97 and the second movable guide rail 98, the vehicle 2 can smoothly travel on the mainline track 20A.

In addition, as shown in FIG. 11, when the second movable guide rail 98 is selected by the switch 26, that is, the second position P2 is selected, the guide surfaces of the second movable guide rail 98 and the mainline track guide rail 95 are connected to each other, the second guide wheels 15 are introduced from the mainline track guide rail 95 to the second fixed guide rail 40 via the second movable guide rail 98, and thus the vehicle 2 travels on the pick-up and delivery travel path 23.

At this time, the outer circumferential surfaces of the first guide wheels 14 on the left side engage with the guide surface 91a of the guide rail 91 on the left side toward the traveling direction of the vehicle 2, and the outer circumferential surfaces of the second guide wheels 15B engage with the guide surface of the second movable guide rail 98. In this way, the movement of the vehicle 2 to both sides in the width direction Xc is regulated.

Moreover, since the second guide wheels 15B on the left side in the traveling direction pass between the first movable guide rail 97 and the second movable guide rail 98, the vehicle 2 can smoothly travel on the pick-up and delivery travel path 23.

In the track-based transportation system 1C of the present embodiment, traveling on the mainline tracks 20A and 20B at the center guide type is possible, and similar to the case of the first embodiment, the width between the double-line tracks of the vehicle pick-up and delivery device 3 is reduced, and the occupation range of the track width in the width direction can be suppressed.

Figure 15:
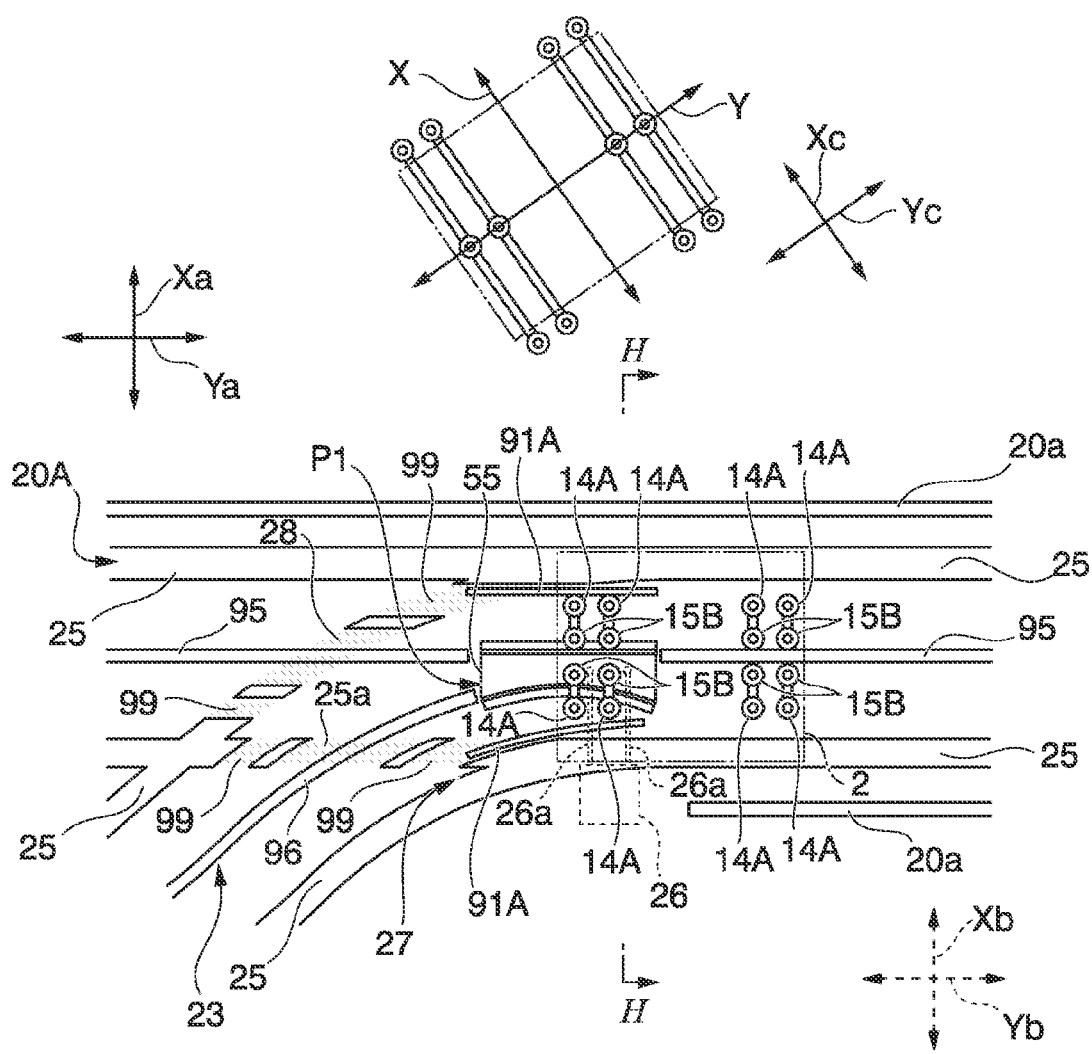
FIG. 15 is a view of a track-based transportation system according to a first modified example of the fourth embodiment of the present invention when viewed from above, and shows a case in which a vehicle travels in a direction along a mainline track.
Figure 16:
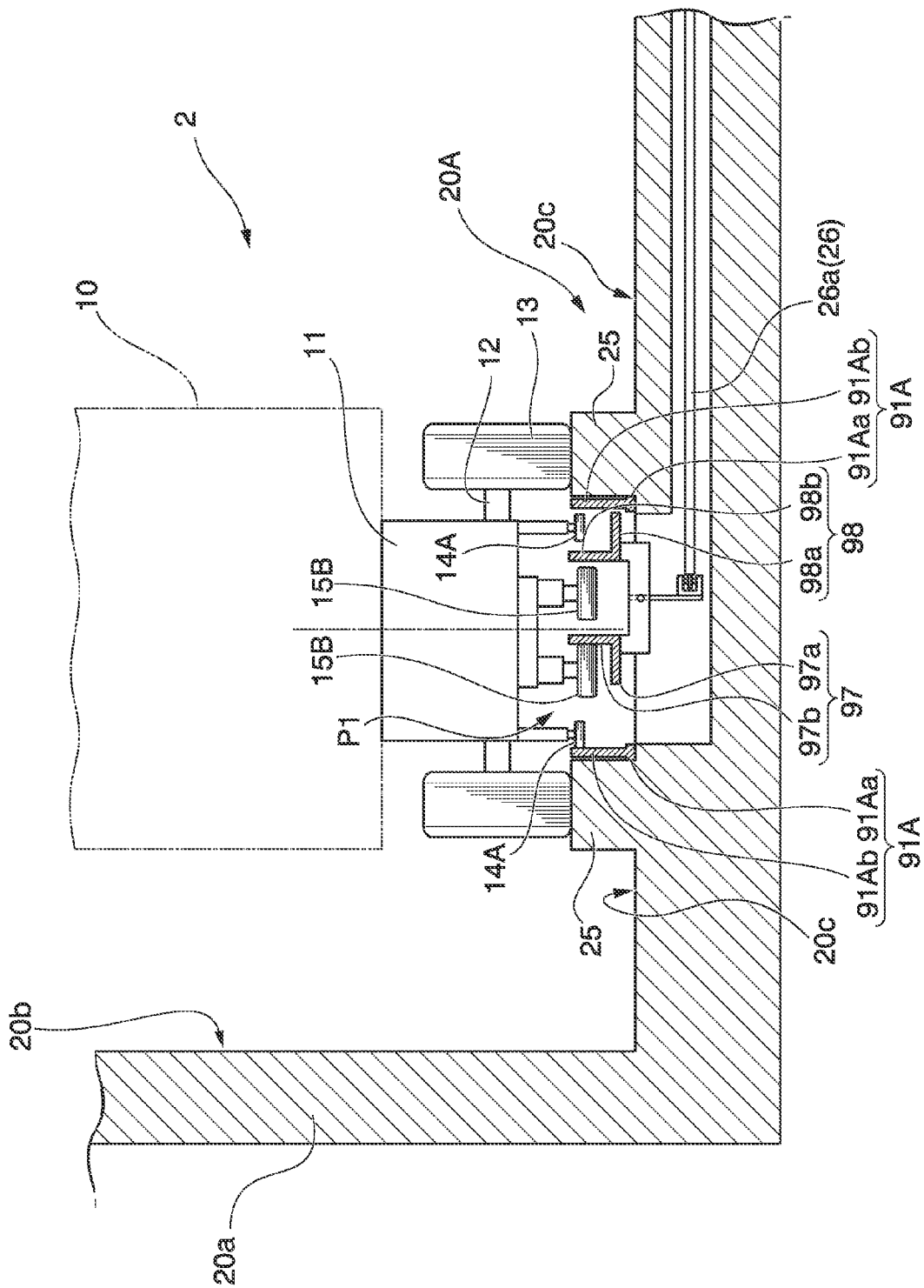
FIG. 16 is a cross-sectional view of the track-based transportation system according to the first modified example of the fourth embodiment of the present invention when viewed in the front-rear direction, and shows an H-H cross-section of FIG. 15.

Here, FIGS. 15 and 16 show a first modified example of the present embodiment, and for example, the first guide wheels 14A may not be provided on both side portions of the vehicle 2, and may be disposed between the second guide wheels 15B and the side portions of the vehicle 2 in the inside in the width direction X of the vehicle 2. Moreover, the guide rails 91A are provided to engage with the first guide wheels 14A from the outside in the width direction Xa and Xb. In this case, the width between the double-line tracks of the vehicle pick-up and delivery device 3 can be further reduced, and the occupation range of the track width in the width direction can be suppressed. In addition, in the present first modified example, the guide rails 91A are installed in the inside in the width directions Xa and Xb of the travel portions 25, a convex portion 91Ab protrudes upward from a bottom portion 91Aa, and thus the cross-sectional shape of the guide rail 91A is a convex shape. The first guide wheels 14A engage with the convex portion 91Ab from the inside in the width directions Xa, Xb, and Xc.

Moreover, the embedded portions 25a and 28 are formed so that the second guide wheels 15B just pass through the embedded portions 25a and 28, and stepped portions 99 recessed downward are formed on the travel portions 25 so that the first guide wheels 14A do not interfere with the travel portions 25 when the vehicle 2 travels on the mainline track 20A (20B) and the pick-up and delivery travel path 23. Moreover, opening widths of the stepped portions 99 are set to such an extent that the rubber tires 13 can cross the stepped portions 99 when the rubber tires 13 travel on the travel portions 25.

Figure 17:
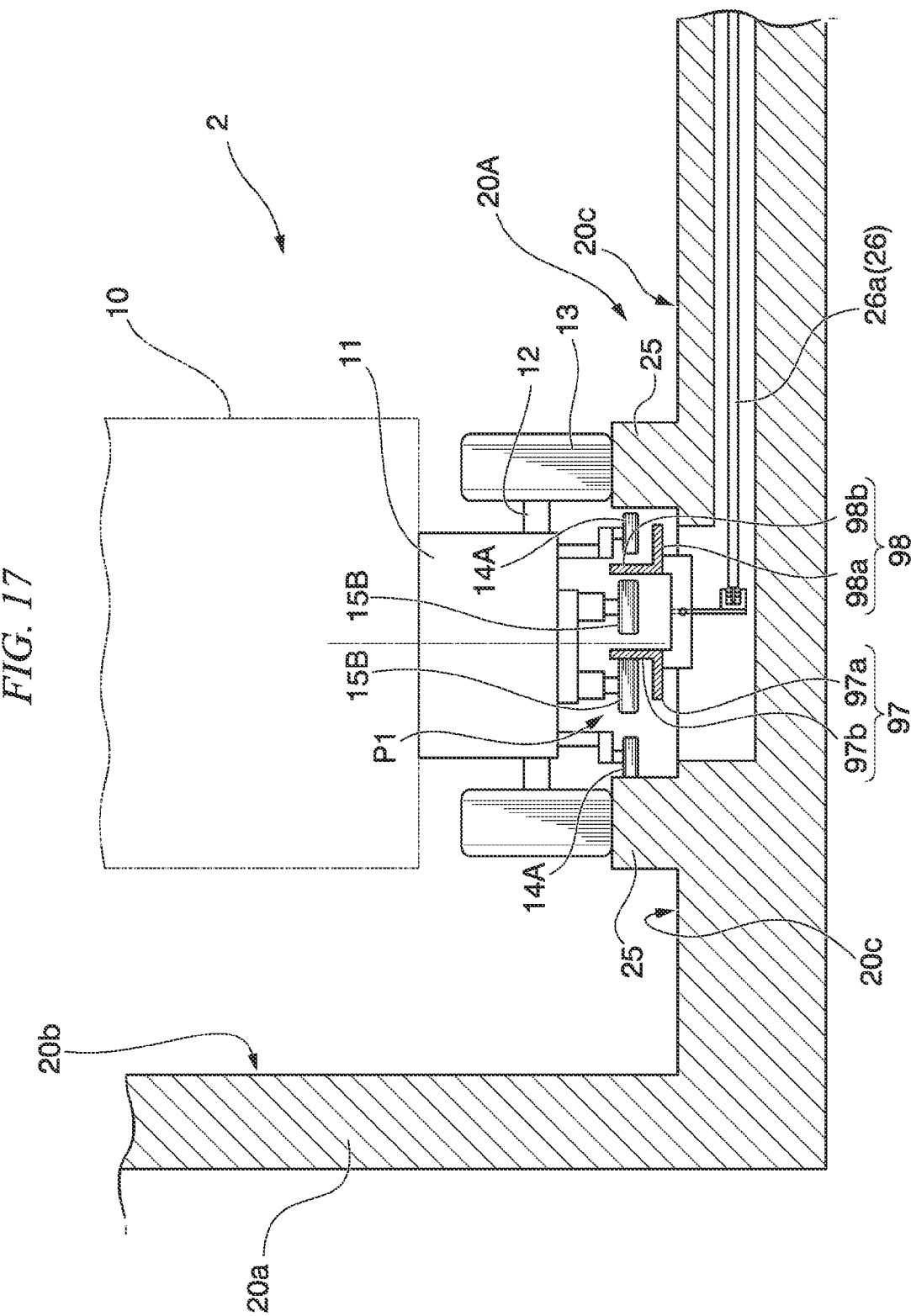
FIG. 17 is a cross-sectional view of a track-based transportation system according to a second modified example of the fourth embodiment of the present invention when viewed in the front-rear direction, and shows the same cross-sectional position as the H-H cross-section of FIG. 15.

Moreover, FIG. 17 shows a second modified example of the present embodiment, and similar to the first modified example, in the second modified example, the first guide wheels 14A may be disposed between the second guide wheels 15B and the side portions of the vehicle 2, and the inner surfaces in the width directions Xa, Xb, and Xc of the travel portions 25 may function in place of the guide rails 91A. In this case, since the guide rails 91A need not be provided, a cost reduction is possible. Moreover, in order to achieve reinforcement and surface smoothing of the inner surfaces in the width directions Xa, Xb, and Xc of the travel portions 25, a metal sheet or the like may be attached to the inner surfaces. Moreover, one guide wheel of the pair of first guide wheels 14 may be guided by the guide rail 91A, and the other guide wheel of the pair of first guide wheels 14 may be guided by the inner surfaces in the width directions Xa, Xb, and Xc of the travel portion 25.

The present embodiment is not limited to the case in which the cross-sectional shape of the mainline track guide rail 95 has an H-shaped cross-section, and for example, like the first fixed guide rail 30A of the second embodiment, the cross-sectional shape may be convex.

Preferred embodiments of the present invention have been described above. However, the present invention is not limited to the above-described embodiments. Addition, omission, substitution, and other modifications of configurations can be realized within a range which does not depart from the scope of the present invention. The present invention is not limited by the descriptions and is limited only by the scope of the appended claims.

For example, in the embodiments, the case in which there is one vehicle 2 is described. However, a plurality of vehicles 2 may be connected.

Moreover, the number of the first guide wheels 14 and the second guide wheels 15, 15A, and 15B is not limited to the number installed in the above-described embodiment. For example, in the first embodiment, two second guide wheels 15 are provided for each traveling device 11, and four second guide wheels 15 are provided for each vehicle 2. However, one or three second guide wheels 15 may be provided for each traveling device 11.

Moreover, each of the guide rails 21 and 91 has an H-shaped cross-section. However, the present invention is not limited to the H-shaped cross-section, and for example, each of the guide rails 21 and 91 may be any member as long as each of the guide rails 21 and 91 has a surface parallel to the side wall 20a so as to engage with the outer circumferential surfaces of the first guide wheels 14. Moreover, also in the guide rail 91A, the cross-sectional shape is not limited to the convex shape and may have an H shape.

Moreover, the traveling direction of the vehicle 2 is not limited to the cases of the embodiments and may be a reverse direction (a direction from the left toward the right in the paper surface of FIG. 1).

In addition, in the embodiments, the second fixed guide rail 40 is disposed at the approximate center in the width direction Xc of the pick-up and delivery travel path 23. However, the second fixed guide rail 40 may be provided on both side portions in the width direction Xc of the pick-up and delivery travel path 23. In this case, the second guide wheels 15, 15A, and 15B should be provided at the approximate center in the width direction X of the vehicle 2, and the second guide wheels 15, 15A, and 15B should also be provided on both side portions in the width direction X of the vehicle 2.

INDUSTRIAL APPLICABILITY

The present invention relates to a vehicle pick-up and delivery device which picks up and delivers a vehicle between two traveling tracks, and a track-based transportation system provided therewith. According to the vehicle pick-up and delivery device and the track-based transportation system of the present invention, a second guide wheel of a vehicle is guided by a second guide portion provided inside the pick-up and delivery travel path, and thus a width between double-line tracks in the pick-up and delivery travel path is reduced, and pick-up and delivery of the vehicle can be performed using a simple configuration while suppressing an occupation range in a width direction.

REFERENCE SIGNS LIST

1: track-based transportation system
2: vehicle
3: vehicle pick-up and delivery device
10: vehicle body
11: traveling device
12: rotation shaft
13: rubber tire
14: first guide wheel
15: second guide wheel
20A, 20B: mainline track
20a: side wall
20b: inner surface
20c: bottom surface
21: guide rail (first guide portion)
21a: guide surface
22: support portion
23: pick-up and delivery travel path
23c: bottom surface
24: switching unit
25: travel portion
25a: embedded portion
26: switch (moving unit)
26a: actuator
27: branch portion
28: embedded portion
30: first fixed guide rail
30a: bottom portion
30b: side portion
40: second fixed guide rail (second guide portion)
40a: concave portion
40b: side portion
40c: bottom portion
40d: extension
50: first movable guide rail (branch guide portion, first branch rail)
50a: concave portion
50b: side portion
50c: bottom portion
55: shaft
60: second movable guide rail (branch guide portion, second branch rail)
60a: concave portion
60b: side portion
60c: bottom portion
1A: track-based transportation system
15A: second guide wheel
30A: first fixed guide rail 40A: second fixed guide rail (auxiliary guide portion)
50A: first movable guide rail
60A: second movable guide rail
70: convex portion
X, Xa, Xb, Xc: width direction
Y, Ya, Yb, Yc: front-rear direction
P1: first position
P2: second position
80: movable guide rail (branch guide portion)
80a: first guide surface
80b: second guide surface
1C: track-based transportation system
91: guide rail
91a: guide surface
94: switching unit
95: mainline track guide rail
96: second fixed guide rail
15B: second guide wheel
97: first movable guide rail
97a: bottom portion
97b: side portion
98: second movable guide rail
98a: bottom portion
98b: side portion
14A: first guide wheel
91A: guide rail
91Aa: bottom portion
91Ab: convex portion
99: stepped portion

The invention claimed is:

1. A vehicle pick-up and delivery device comprising:
two mainline tracks which include a pair of first guide portions which guide a pair of first guide wheels provided on a vehicle, the first guide portions being disposed outside the respective first guide wheels;
a pick-up and delivery travel path on which the vehicle is capable of traveling and which is provided between the two mainline tracks and is configured to pick up and deliver the vehicle between the two mainline tracks;
a second guide portion which is provided inside the pick-up and delivery travel path and guides a second guide wheel disposed below the vehicle; and
a switching unit which is mechanically connected to the mainline tracks and is capable of switching a direction of the vehicle between a direction along the mainline tracks and a direction along the pick-up and delivery travel path, wherein
the switching unit includes:
a branch guide portion which is provided on an end of the second guide portion and includes a first end and a second end; and
a moving unit which is connected to the second end and rotates the branch guide portion around the first end.

2. The vehicle pick-up and delivery device according to claim 1, wherein the two mainline tracks include the pair of first guide portions only at a position in which the vehicle is switched by the switching unit.

3. The vehicle pick-up and delivery device according to claim 1, wherein the pair of first guide portions are guide rails which are disposed outside both side portions of the vehicle.

4. The vehicle pick-up and delivery device according to claim 1, wherein the pair of first guide portions are guide rails which are disposed between both side portions of the vehicle in a width direction of the vehicle.

5. The vehicle pick-up and delivery device according to claim 1, wherein the pair of first guide portions are provided to be convex on the mainline tracks and the pick-up and delivery travel path, and are configured of inner surfaces in a width direction of a travel path on which a pair of tires are rolled.

6. The vehicle pick-up and delivery device according to claim 1, wherein the second guide portion is provided at a center in a width direction of the pick-up and delivery travel path.

7. The vehicle pick-up and delivery device according to claim 1, wherein
the second guide wheel is a guide roller which is capable of rotating around an axis extending in a vertical direction, and
the second guide portion is a guide rail which regulates the second guide wheel in a width direction of the vehicle.

8. The vehicle pick-up and delivery device according to claim 7, wherein a concave portion, which is opened upward in a longitudinal direction of the second guide portion and into which the second guide wheel is inserted from above, is formed in the second guide portion.

9. The vehicle pick-up and delivery device according to claim 7, wherein the second guide portion is interposed by the second guide wheels which are provided in pairs on the vehicle.

10. The vehicle pick-up and delivery device according to claim 1, wherein the switching unit includes:
a pair of branch guide portions each of which is capable of guiding the second guide wheel; and
a moving unit which is provided on an outer side in a width direction of the branch guide portions, and is capable of moving the pair of branch guide portions to a first position in which one of the branch guide portions is capable of guiding the second guide wheel in a direction along the mainline track and the other of the branch guide portions does not interfere with the second guide wheel, and to a second position in which the other of the branch guide portions is capable of guiding the second guide wheel in a direction along the pick-up and delivery travel path and the one of the branch guide portions does not interfere with the second guide wheel.

11. The vehicle pick-up and delivery device according to claim 10, wherein the branch guide portions are provided at a center in a width direction of the mainline track.

12. The vehicle pick-up and delivery device according to claim 11, wherein one of the pair of branch guide portions is a first branch rail which is capable of guiding the second guide wheel to the first position, and the other of the pair of branch guide portions is a second branch rail which is capable of guiding the second guide wheel to the second position.

13. The vehicle pick-up and delivery device according to claim 12, wherein concave portions, which are opened upward in longitudinal directions of the first branch rail and the second branch rail and into which the second guide wheel is inserted from above, are formed on the first branch rail and the second branch rail.

14. A track-based transportation system comprising:
the vehicle pick-up and delivery device according to claim 1; and
the vehicle, wherein the second guide wheel is disposed below the vehicle.

* * * * *